(12) United States Patent  
Anegawa et al.

(10) Patent No.: US 12,005,506 B2  
(45) Date of Patent: Jun. 11, 2024

(54) METHOD FOR SHAPING THREE-DIMENSIONAL SHAPED OBJECT

(71) Applicant: SEIKO EPSON CORPORATION, Tokyo (JP)

(72) Inventors: Kenta Anegawa, Matsumoto (JP); Daizo Aoyagi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 105 days.

(21) Appl. No.: 16/802,076

(22) Filed: Feb. 26, 2020

(65) Prior Publication Data

US 2020/0269502 A1   Aug. 27, 2020

(30) Foreign Application Priority Data

Feb. 27, 2019  (JP) .................................. 2019-033677

(51) Int. Cl.
*B29C 64/106* (2017.01)
*B22D 23/00* (2006.01)
(Continued)

(52) U.S. Cl.
CPC .............. *B22F 3/24* (2013.01); *B22D 23/003* (2013.01); *B22F 10/18* (2021.01); *B22F 10/22* (2021.01);
(Continued)

(58) Field of Classification Search
CPC ...... B23Q 15/12; B23Q 15/14; B23Q 15/013; B23Q 15/22; B23Q 15/24; B29C 64/188; B29C 64/209; B29C 64/106; B29C 64/295; B29C 64/379; B33Y 10/00; B33Y 30/00; B33Y 40/20; B33Y 40/00; B22D 23/003;
(Continued)

(56) References Cited

U.S. PATENT DOCUMENTS

2003/0185697 A1  10/2003  Abe et al.
2005/0029711 A1   2/2005  Abe et al.
(Continued)

FOREIGN PATENT DOCUMENTS

CN     1497480 A     5/2004
EP     0967067 A1   12/1999
(Continued)

*Primary Examiner* — Larry W Thrower
*Assistant Examiner* — Tiffany Yu Huang
(74) *Attorney, Agent, or Firm* — CHIP LAW GROUP

(57) ABSTRACT

Provided is a method for shaping a three-dimensional shaped object using a cutting tool configured to perform cutting at a first length at maximum in a predetermined cutting direction, the method including: a first section shaping step of shaping a first section having a length in a first direction shorter than the first length by laminating a shaping material; a first section cutting step of cutting the first section with the cutting tool having a cutting direction along the first direction; a second section shaping step of shaping a second section having a length in a second direction shorter than the first length by laminating the shaping material, to connect to a first end surface of the first section in the first direction; and a second section cutting step of cutting the second section along the second direction with the cutting tool having a cutting direction along the second direction.

6 Claims, 15 Drawing Sheets

(51) Int. Cl.

| | |
|---|---|
| *B22F 3/24* | (2006.01) |
| *B22F 10/18* | (2021.01) |
| *B22F 10/22* | (2021.01) |
| *B22F 10/50* | (2021.01) |
| *B22F 10/66* | (2021.01) |
| *B22F 10/80* | (2021.01) |
| *B22F 12/13* | (2021.01) |
| *B22F 12/53* | (2021.01) |
| *B28B 1/00* | (2006.01) |
| *B29C 64/188* | (2017.01) |
| *B29C 64/209* | (2017.01) |
| *B33Y 10/00* | (2015.01) |
| *B33Y 30/00* | (2015.01) |
| *B33Y 40/00* | (2020.01) |
| *B22F 12/17* | (2021.01) |

(52) U.S. Cl.
CPC ............. *B22F 10/50* (2021.01); *B22F 10/66* (2021.01); *B22F 10/80* (2021.01); *B22F 12/13* (2021.01); *B22F 12/53* (2021.01); *B28B 1/001* (2013.01); *B29C 64/106* (2017.08); *B29C 64/188* (2017.08); *B29C 64/209* (2017.08); *B33Y 10/00* (2014.12); *B33Y 30/00* (2014.12); *B22F 12/17* (2021.01)

(58) Field of Classification Search
CPC .......... B28B 1/001; Y02P 10/25; B22F 10/10; B22F 2999/00; B22F 2003/247; B22F 2003/248; B22F 3/24; B22F 1/0062; B22F 1/0074
See application file for complete search history.

(56) References Cited

U.S. PATENT DOCUMENTS

| | | | |
|---|---|---|---|
| 2014/0303942 A1 | 10/2014 | Wighton et al. | |
| 2015/0320956 A1* | 11/2015 | Dunne | B29C 33/52 |
| | | | 128/207.14 |
| 2016/0175932 A1 | 6/2016 | Dimter et al. | |
| 2018/0093350 A1* | 4/2018 | Koch | B33Y 10/00 |
| 2019/0263068 A1* | 8/2019 | Mannarino | A61F 2/06 |
| 2019/0283324 A1 | 9/2019 | Tarumi et al. | |
| 2020/0130256 A1* | 4/2020 | Debora | B32B 27/08 |

FOREIGN PATENT DOCUMENTS

| | | | | |
|---|---|---|---|---|
| EP | 2910323 B1 | 4/2017 | | |
| EP | 3543011 A1 * | 3/2019 | ............ | B29C 64/30 |
| EP | 3543011 A1 | 9/2019 | | |
| JP | 2003-313604 A | 11/2003 | | |
| JP | 2016-068466 A | 5/2016 | | |
| JP | 2016533903 A | 11/2016 | | |
| JP | 2017144446 A | 8/2017 | | |
| JP | 2018118413 A | 8/2018 | | |
| JP | 3219199 U | 12/2018 | | |
| JP | 6458182 B1 | 1/2019 | | |
| WO | 2006046671 A1 | 5/2006 | | |
| WO | 2018079626 A1 | 5/2018 | | |

\* cited by examiner

METHOD FOR SHAPING THREE-DIMENSIONAL SHAPED OBJECT

The present application is based on, and claims priority from JP Application Serial Number 2019-033677, filed Feb. 27, 2019, the disclosure of which is hereby incorporated by reference herein in its entirety.

BACKGROUND

1. Technical Field

The present disclosure relates to a method for shaping a three-dimensional shaped object.

2. Related Art

For example, JP-A-2003-313604 discloses a method in which a metal powder layer is irradiated and sintered with a laser and a plurality of sintered layers are laminated, so as to manufacture a metal powder sintered component. In this method, after the sintered layer is formed larger than a desired shape by a predetermined size, an unnecessary portion of the sintered layer is removed by a cutting process.

When a three-dimensional shaped object is to be formed by removing an unnecessary portion from a formed layer through a cutting process as in the method described above, a three-dimensional shaped object having a desired shape cannot be formed because a cutting tool may not reach the unnecessary portion. For example, when forming a three-dimensional shaped object having a tubular shape and having a length longer than a cuttable length of the cutting tool, the three-dimensional shaped object having a desired shape cannot be formed because the cutting tool does not reach an inner peripheral surface of the tube.

SUMMARY

An object of the present application is to improve a degree of freedom of shaping a three-dimensional shaped object formed by lamination and cutting process of a shaping material.

According to an aspect of the present disclosure, there is provided a method for shaping a three-dimensional shaped object using a cutting tool configured to perform cutting at a first length at maximum in a predetermined cutting direction. The method for shaping a three-dimensional shaped object includes: a first section shaping step of shaping a first section having a length in a first direction shorter than the first length by laminating a shaping material; a first section cutting step of cutting the first section with the cutting tool having a cutting direction along the first direction; a second section shaping step of shaping a second section having a length in a second direction shorter than the first length by laminating the shaping material, to connect to a first end surface of the first section in the first direction; and a second section cutting step of cutting the second section along the second direction with the cutting tool having a cutting direction along the second direction.

DESCRIPTION OF EXEMPLARY EMBODIMENTS

A. First Embodiment

Figure 1:
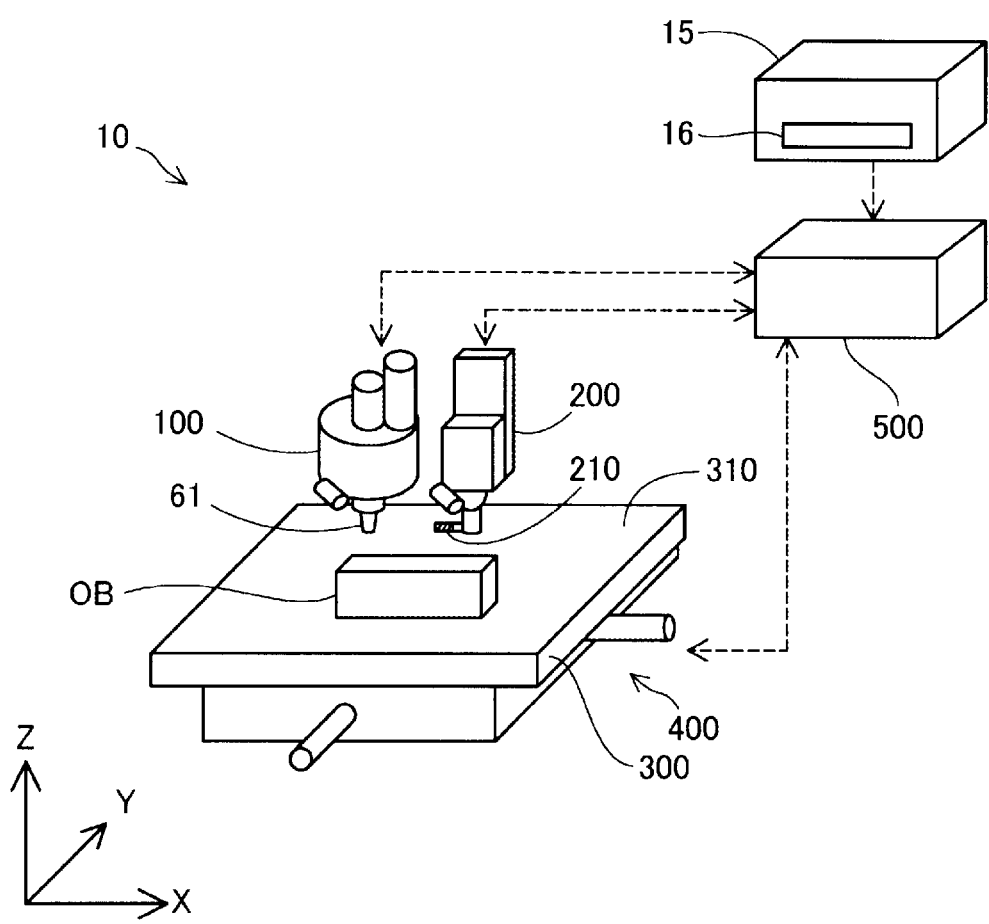
FIG. 1 is an illustrative diagram illustrating a schematic configuration of a three-dimensional shaping device according to a first embodiment.

FIG. 1 is an illustrative diagram illustrating a schematic configuration of a three-dimensional shaping device 10 according to a first embodiment. In FIG. 1, arrows along X, Y, and Z directions orthogonal to each other are shown. The X direction and the Y direction are directions along a horizontal direction and the Z direction is a direction along a vertical direction. In other figures, the arrows along the X, Y, and Z directions are shown as appropriate. The X, Y, and Z directions in FIG. 1 indicate the same directions as the X, Y, and Z directions in other figures indicate.

The three-dimensional shaping device 10 according to the present embodiment includes a discharge unit 100, a cutting unit 200, a stage 300, a moving mechanism 400, and a control unit 500. An information processing device 15 is connected to the control unit 500. The three-dimensional shaping device 10 and the information processing device 15 can also be combined and regarded as a three-dimensional shaping device in a broad sense.

Under control of the control unit 500, the three-dimensional shaping device 10 causes a shaping material to be discharged to a shaping surface 310 of the stage 300 from a nozzle 61 provided at the discharge unit 100 and changes a relative position between the nozzle 61 and the stage 300 by driving the moving mechanism 400, so as to laminate the shaping material on the stage 300. A detailed configuration of the discharge unit 100 will be described below with reference to FIG. 2.

Further, under the control of the control unit 500, the three-dimensional shaping device 10 according to the present embodiment rotates a cutting tool 210 attached to the cutting unit 200 and changes a relative position between the cutting tool 210 and the stage 300 by driving the moving mechanism 400, so as to cut the shaping material laminated on the stage 300. In this way, the three-dimensional shaping device 10 forms a three-dimensional shaped object OB having a desired shape. Note that the three-dimensional shaped object OB is schematically illustrated in FIG. 1.

The cutting unit 200 is a cutting device for cutting the shaping material laminated on the stage 300 by rotating the cutting tool 210 attached to a shaft of a head tip end of the cutting unit 200. As the cutting tool 210, for example, a flat end mill or a ball end mill can be used. The cutting unit 200 detects a position of a tip end of the cutting tool 210 by a general position detection sensor, and transmits a detection result to the control unit 500. The control unit 500 uses the detection result to control a relative positional relationship between the cutting tool 210 and the laminated shaping material with the moving mechanism 400 to be described below, so as to perform cutting. The cutting unit 200 may include a static eliminator such as an ionizer.

The moving mechanism 400 changes a relative position between the discharge unit 100 and the stage 300, and a relative position between the cutting unit 200 and the stage 300. In the present embodiment, the moving mechanism 400 moves the stage 300 with respect to the discharge unit 100 and the cutting unit 200. The moving mechanism 400 according to the present embodiment is implemented by a three-axis positioner for moving the stage 300 in three axial directions of the X, Y, and Z directions by driving forces of three motors. Each motor is driven under the control of the control unit 500. Instead of moving the stage 300, the moving mechanism 400 may be configured to move the discharge unit 100 and the cutting unit 200 without moving the stage 300. The moving mechanism 400 may be configured to move the discharge unit 100 and the cutting unit 200 as well as the stage 300.

The control unit 500 is implemented by a computer including one or more processors, a main storage device, and an input/output interface for inputting a signal from the outside and outputting a signal to the outside. In the present embodiment, the control unit 500 performs various functions by the processor executing a program or a command read in the main storage device. The control unit 500 may be implemented by a combination of a plurality of circuits, instead of a computer.

The information processing device 15 is implemented by a computer including one or more processors, a main storage device, and an input/output interface for inputting a signal from the outside and outputting a signal to the outside. In the present embodiment, the information processing device 15 performs various functions by the processor executing a program or a command read in the main storage device. The information processing device 15 includes a data generation unit 16. As will be described below with reference to FIGS. 5 to 10, the data generation unit 16 generates shaping data and cutting data, for the control unit 500 of the three-dimensional shaping device 10 to control the discharge unit 100, the cutting unit 200, and the moving mechanism 400.

Figure 2:
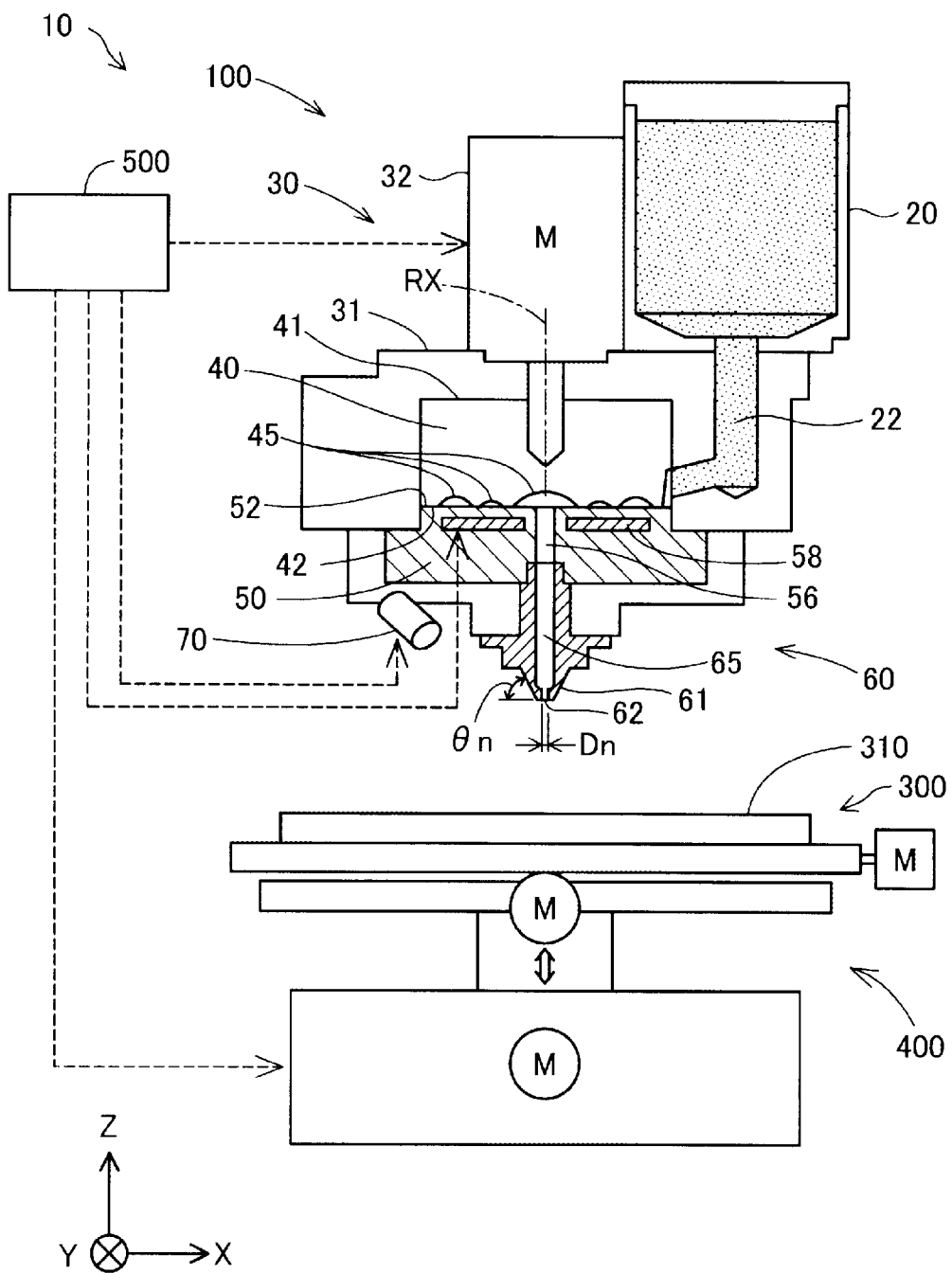
FIG. 2 is an illustrative diagram illustrating a schematic configuration of a discharge unit according to the first embodiment.

FIG. 2 is an illustrative diagram illustrating a schematic configuration of the discharge unit 100 according to the present embodiment. The discharge unit 100 includes a material supply unit 20, a melting unit 30, a discharge part 60, and a reheating unit 70. The material supply unit 20 is supplied with a material in a state of pellets, powder, or the like. In the present embodiment, the material is a pellet-like ABS resin. The material supply unit 20 according to the present embodiment is implemented by a hopper. The material supply unit 20 and the melting unit 30 are coupled by a supply path 22 provided below the material supply unit 20. The material supplied to the material supply unit 20 is supplied to the melting unit 30 via the supply path 22.

The melting unit 30 includes a screw case 31, a drive motor 32, a flat screw 40, and a barrel 50. The melting unit 30 melts at least apart of the material in a solid state supplied from the material supply unit 20 to form a paste-like shaping material having fluidity, and supplies the melted material to the nozzle 61. The flat screw 40 may simply be referred to as a screw.

The screw case 31 accommodates the flat screw 40. The drive motor 32 is fixed to an upper surface of the screw case 31. A rotation shaft of the drive motor 32 is coupled to an upper surface 41 of the flat screw 40.

The flat screw 40 has a substantially columnar shape whose height in a direction along a central axis RX is smaller than a diameter thereof. The flat screw 40 is disposed in the screw case 31 such that the central axis RX is parallel to the Z direction. Torque generated by the drive motor 32 causes the flat screw 40 to rotate around the central axis RX in the screw case 31.

The flat screw 40 includes a groove forming surface 42 on a side opposite to the upper surface 41 in the direction along the central axis RX. A groove portion 45 is formed in the groove forming surface 42. A detailed shape of the groove forming surface 42 of the flat screw 40 will be described below with reference to FIG. 3.

The barrel 50 is provided below the flat screw 40. The barrel 50 includes a screw facing surface 52 facing the groove forming surface 42 of the flat screw 40. A heater 58 is built in the barrel 50 at a position facing the groove portion 45 of the flat screw 40. A temperature of the heater 58 is controlled by the control unit 500. The heater 58 may be referred to as a heating unit.

A communication hole 56 is provided at a center of the screw facing surface 52. The communication hole 56 is in communication with the nozzle 61. A detailed shape of the screw facing surface 52 of the barrel 50 will be described below with reference to FIG. 4.

The discharge part 60 includes the nozzle 61. The nozzle 61 is provided with a nozzle flow path 65 and a nozzle hole 62. The nozzle flow path 65 is in communication with the communication hole 56 of the melting unit 30. The nozzle hole 62 is an opening that is provided in a tip end portion of the nozzle 61 and that is in communication with the nozzle flow path 65. The shaping material supplied from the melting unit 30 to the nozzle 61 is discharged from the nozzle hole 62. In the present embodiment, the nozzle 61 is provided with the nozzle hole 62 having a circular shape. A diameter of the nozzle hole 62 is referred to as a nozzle diameter Dn. The nozzle 61 is disposed such that a side surface of a tip end of the nozzle 61 is at an inclination angle θn with respect to the stage 300. The shape of the nozzle hole 62 is not limited to a circular shape, and may be a quadrilateral shape or the like.

The reheating unit 70 re-heats the shaping material laminated and cured on the stage 300. In the present embodiment, the reheating unit 70 is implemented by a heater disposed adjacent to the nozzle 61. A temperature of the reheating unit 70 is controlled by the control unit 500.

Figure 3:
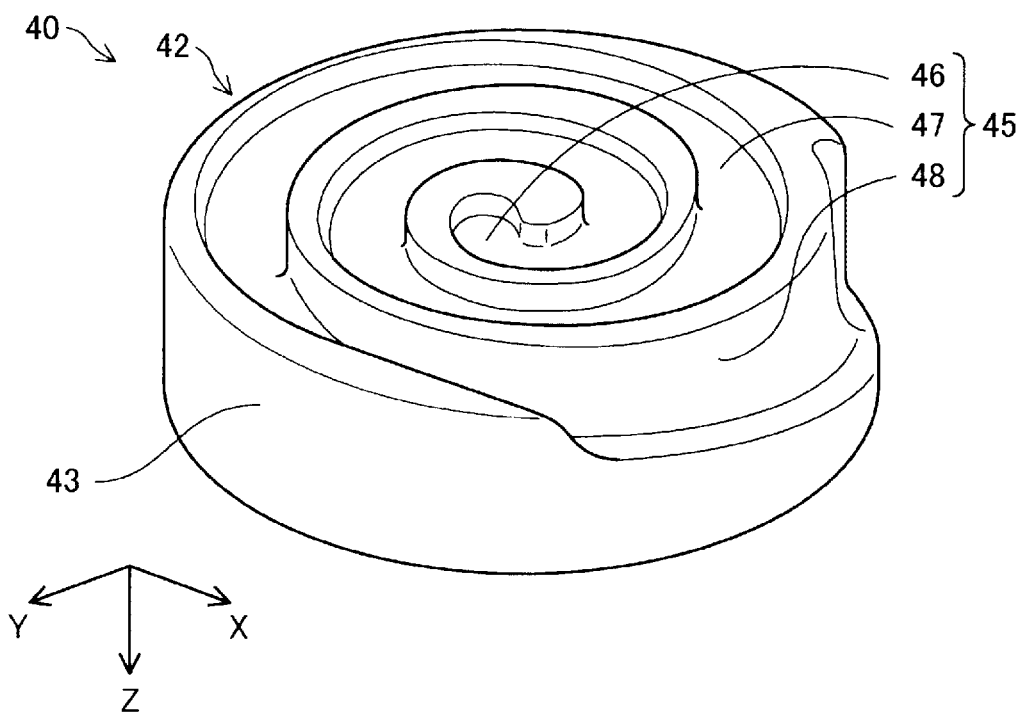
FIG. 3 is a perspective view illustrating a configuration of a groove forming surface of a flat screw according to the first embodiment.

FIG. 3 is a perspective view illustrating a configuration of the groove forming surface 42 of the flat screw according to the present embodiment. For easy understanding of the technique, the flat screw 40 shown in FIG. 3 is illustrated in a state in which an upper-lower positional relationship illustrated in FIG. 2 is reversed. As described above, the groove portion 45 is formed in the groove forming surface 42 of the flat screw 40. The groove portion 45 includes a central portion 46, a vortex portion 47, and a material introduction portion 48.

The central portion 46 is a circular cavity formed around the central axis RX of the flat screw 40. The central portion 46 faces the communication hole 56 provided in the barrel 50.

The vortex portion 47 is a groove extending in a vortex shape obtained by drawing arcs around the central portion 46 and to an outer periphery of the groove forming surface 42. The vortex portion 47 may extend in an involute curve shape or a spiral shape. One end of the vortex portion 47 is coupled to the central portion 46. The other end of the vortex portion 47 is coupled to the material introduction portion 48.

The material introduction portion 48 is a groove that is wider than the vortex portion 47 and that is provided at an outer peripheral edge of the groove forming surface 42. The material introduction portion 48 is continuous to a side surface 43 of the flat screw 40. Through the material introduction portion 48, the material supplied from the material supply unit 20 via the supply path 22 is introduced into the vortex portion 47. Although a mode is illustrated in FIG. 3, in which one vortex portion 47 extending from the central portion 46 to the outer periphery of the flat screw 40 and one material introduction portion 48 are provided, a plurality of vortex portions 47 extending from the central portion 46 to the outer periphery of the flat screw 40 and a plurality of material introduction portions 48 may be provided.

Figure 4:
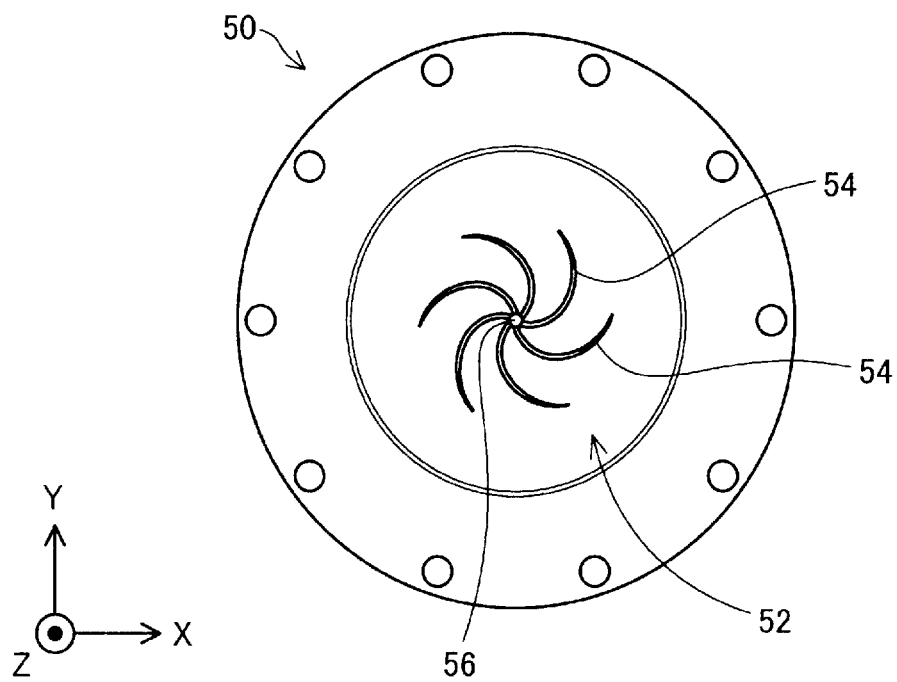
FIG. 4 is a top view illustrating a configuration of a screw facing surface of a barrel according to the first embodiment.

FIG. 4 is a top view illustrating a configuration of the screw facing surface 52 of the barrel 50 according to the present embodiment. As described above, the communication hole 56 in communication with the nozzle 61 is formed at the center of the screw facing surface 52. A plurality of guide grooves 54 are formed around the communication hole 56 in the screw facing surface 52. One end of each guide groove 54 is coupled to the communication hole 56 and extends in a vortex shape from the communication hole 56 to an outer periphery of the screw facing surface 52. Each of the guide grooves 54 has a function of guiding the shaping material into the communication hole 56.

Figure 5:
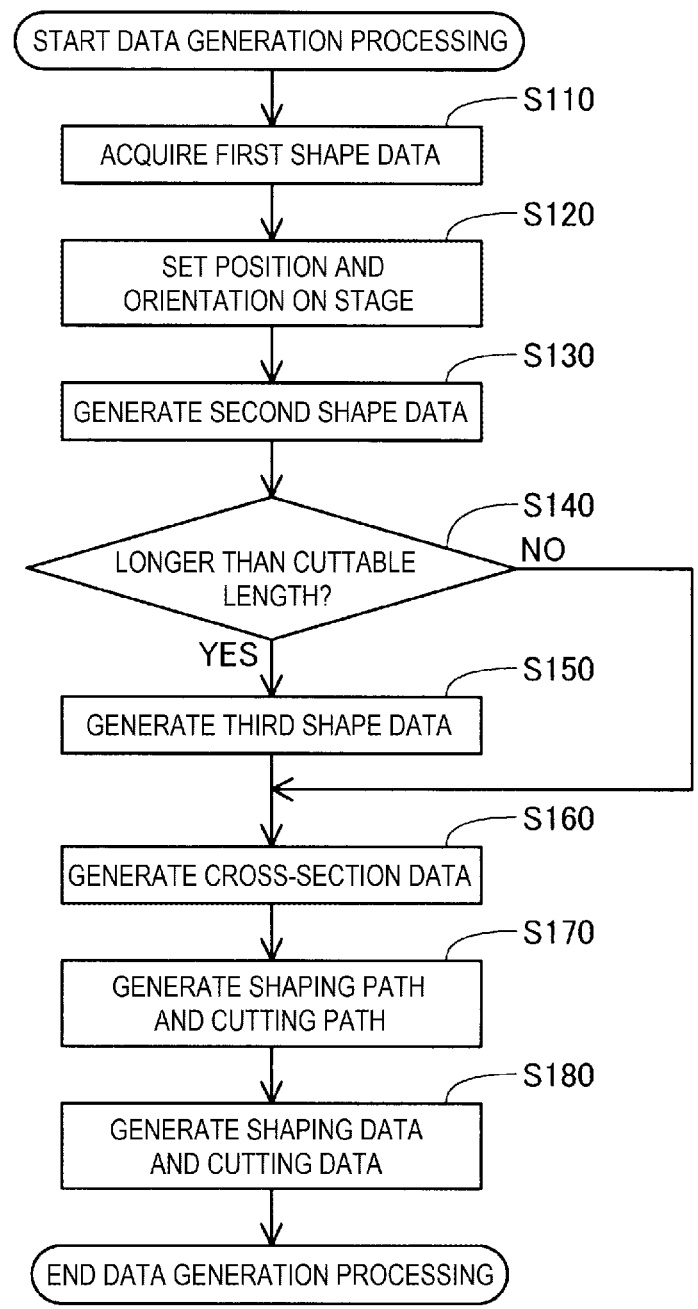
FIG. 5 is a flowchart illustrating contents of a data generation processing according to the first embodiment.

FIG. 5 is a flowchart illustrating contents of a data generation processing according to the present embodiment. This processing is executed by the data generation unit 16 of the information processing device 15 when a user performs a predetermined start operation on the information processing device 15. In the present embodiment, the shaping data and the cutting data are generated by this processing. The shaping data is data used for the three-dimensional shaping device 10 to shape the three-dimensional shaped object OB and for controlling the discharge unit 100 and the moving mechanism 400. The cutting data is data used for the three-dimensional shaping device 10 to cut the three-dimensional shaped object OB and for controlling the cutting unit 200 and the moving mechanism 400.

Figure 6:
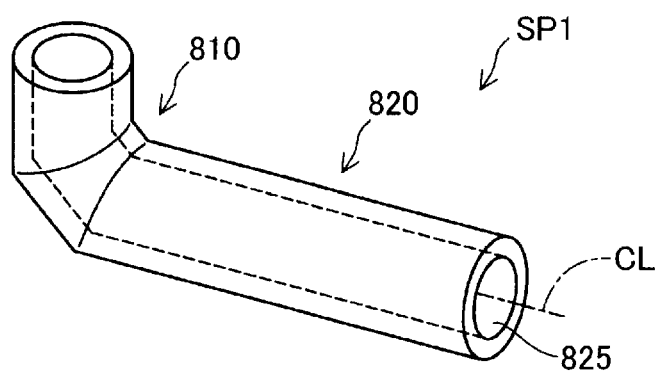
FIG. 6 is a perspective view illustrating a first shape according to the first embodiment.

FIG. 6 is a perspective view illustrating a first shape SP1 represented by first shape data according to the present embodiment. Referring to FIGS. 5 and 6, first, in step S110, the data generation unit 16 acquires the first shape data representing the first shape SP1. The first shape SP1 is a shape representing the three-dimensional shaped object OB created by using three-dimensional CAD software or three-dimensional CG software. That is, the first shape SP1 can be said to be a design shape of the three-dimensional shaped object OB. As the first shape data, for example, data of STL format, IGES format, or STEP format can be used. The data generation unit 16 can acquire the first shape data generated on the information processing device 15 using, for example, three-dimensional CAD software. The data generation unit 16 may acquire the first shape data generated outside the information processing device 15, via a recording medium such as a USB memory. In the present embodiment, the first shape SP1 is a tube shape. The first shape SP1 includes a bent portion 810 which is a portion where the tube is bent, and a linear portion 820 in which the tube extends linearly. The first shape SP1 has an inner wall surface 825 on an inner side of the tube.

In step S120, the data generation unit 16 sets a position and an orientation in which the three-dimensional shaped object OB represented by the first shape SP1 is disposed on the stage 300. For example, the data generation unit 16 sets the position and the orientation in which the first shape SP1 is disposed on the stage 300 according to a position and orientation designated by the user. In the present embodiment, the position and the orientation of the first shape SP1 on the stage 300 are set such that a central axis CL of the linear portion 820 is parallel to the X direction.

Figure 7:
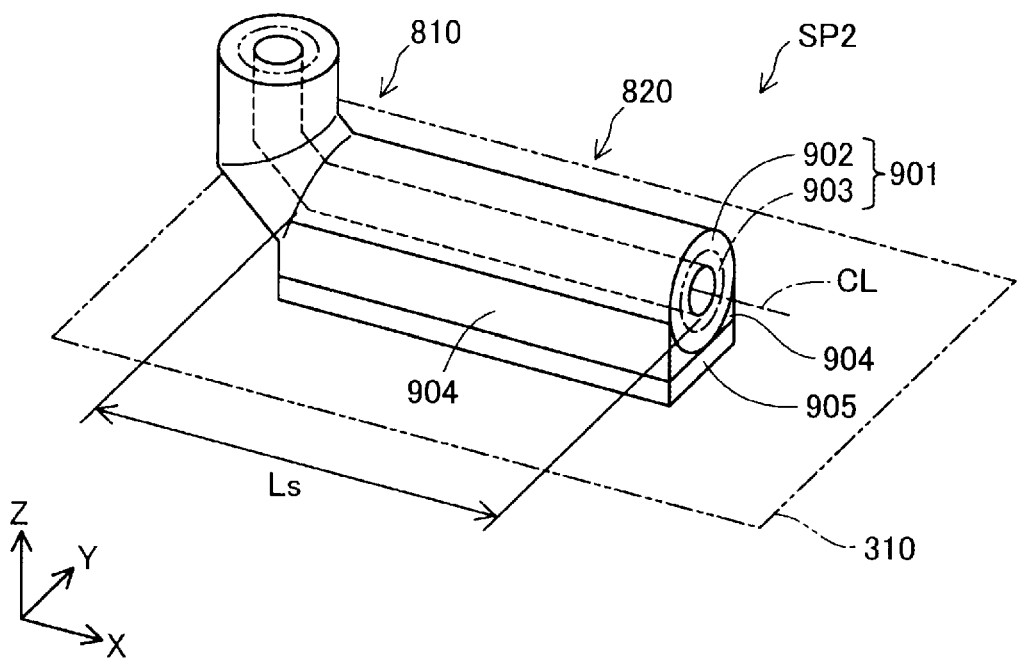
FIG. 7 is a perspective view illustrating a second shape according to the first embodiment.

FIG. 7 is a perspective view illustrating a second shape SP2 represented by second shape data according to the present embodiment. In FIG. 7, as a reference, the shaping surface 310 of the stage 300 is indicated by a dashed line. Referring to FIGS. 5 and 7, in step S130, the data generation unit 16 uses the first shape data and information on a cutting process performed on the three-dimensional shaped object OB, so as to generate the second shape data representing the second shape SP2. The second shape SP2 is a shape of a three-dimensional shaped object OB obtained by adding a cut portion 903, a support portion 904, and a rising portion 905 to the first shape SP1. A portion in both the first shape SP1 and the second shape SP2 is referred to as a main body portion 902. The main body portion 902 and the cut portion 903 in combination are also referred to as a shaping portion 901.

The cut portion 903 is a cutting margin for performing the cutting process on the three-dimensional shaped object OB. For example, the data generation unit 16 disposes the cut portion 903 according to a position and a size for performing the cutting process designated by the user. In the present embodiment, the cut portion 903 is disposed on the inner wall surface 825.

The support portion 904 is a portion for maintaining a shape of the shaping portion 901 when laminating the shaping material to shape the three-dimensional shaped object OB. The data generation unit 16 disposes the support portion 904 at a position designated by the user, for example. The data generation unit 16 determines whether the shape of the three-dimensional shaped object OB can be maintained when shaping the three-dimensional shaped object OB according to the second shape SP2, and may dispose the support portion 904 when it is determined that the shape of the three-dimensional shaped object OB cannot be maintained. In the present embodiment, the support portion 904 is disposed to support a lower surface of the shaping portion 901 in the linear portion 820. When the three-dimensional shaped object OB can be shaped even without using the support portion 904, the support portion 904 may not be provided.

The rising portion 905 is a portion for separating the cut portion 903 and the stage 300 in order to prevent interference between the cutting unit 200 and the stage 300 when the cutting process is performed on the three-dimensional shaped object OB. The data generation unit 16 disposes, for example, the rising portion 905 at a position designated by the user. The data generation unit 16 determines whether there is interference between the cutting unit 200 and the stage 300 when removing the cut portion 903, by the cutting process, from the shaping portion 901 shaped according to the second shape SP2, and may dispose the rising portion 905 when it is determined that there is interference between the cutting unit 200 and the stage 300. In the present embodiment, the rising portion 905 is disposed between the stage 300 and lower surfaces of the shaping portion 901 and the support portion 904. When the three-dimensional shaped object OB can be cut without using the rising portion 905, the rising portion 905 may not be provided.

In step S140, the data generation unit 16 determines whether a length Ls of the cut portion 903 along the X direction is longer than a cuttable length Le of the cutting tool 210 in the X direction. The cuttable length Le means a maximum length over which an object to be processed can be cut in a preset direction. For example, when the cutting tool 210 is inserted into a hollow portion from one end of the tube having a central axis along the X direction, to cut the cutting margin provided on the inner wall surface of the tube, a distance along the X direction from the one end of the tube to a cuttable limit position is the cuttable length Le of the cutting tool 210 in the X direction. The data generation unit 16 determines whether the length Ls of the cut portion 903 along the X direction is longer than the cuttable length Le of the cutting tool 210 in the X direction by using the second shape data and information on the cutting tool 210. The X direction may be referred to as a first direction, and the cuttable length Le may be referred to as a cuttable depth or a first length.

Figure 8:
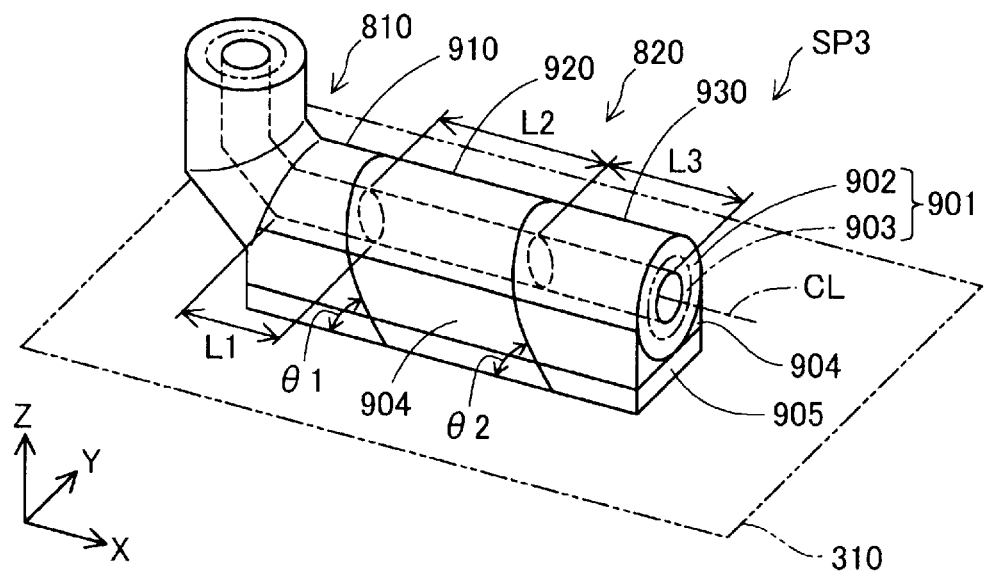
FIG. 8 is a perspective view illustrating a third shape according to the first embodiment.

FIG. 8 is a perspective view illustrating a third shape SP3 represented by third shape data according to the present embodiment. Referring to FIGS. 5 and 8, when it is determined in step S140 that the length Ls of the cut portion 903 along the X direction is longer than the cuttable length Le of the cutting tool 210 in the X direction, the data generation unit 16 uses the second shape data in step S150 to generate the third shape data representing the third shape SP3. The third shape SP3 is a shape of a three-dimensional shaped object OB divided into a plurality of sections. The data generation unit 16 divides the second shape SP2 such that a length of the cut portion 903 along the X direction in each section is shorter than the cuttable length Le of the cutting tool 210 in the X direction, and sets the third shape SP3.

In the present embodiment, the length Ls of the cut portion 903 in the linear portion 820 along the X direction is longer than the cuttable length Le of the cutting tool 210 in the X direction. Therefore, the data generation unit 16 divides the second shape SP2 into a first section 910, a second section 920, and a third section 930 to generate the third shape SP3. The first section 910 is a section including the bent portion 810 and a part of the linear portion 820. The second section 920 is a section including a part of the linear portion 820 adjacent to the first section 910. The third section 930 is a section including a part of the linear portion 820 adjacent to the second section 920. A length L1 of the cut portion 903 along the X direction in the first section 910, a length L2 of the cut portion 903 along the X direction in the second section 920, and a length L3 of the cut portion 903 along the X direction in the third section 930 are shorter than the cuttable length Le of the cutting tool 210 in the X direction.

In the present embodiment, the data generation unit 16 divides the second shape SP2 along a plane inclined with respect to the stage 300 such that interference between the nozzle 61 and the three-dimensional shaped object OB does not occur during the shaping. The second shape SP2 is divided such that a first end surface 911 of the first section 910 on a second section 920 side is inclined at an acute angle with respect to the stage 300 and a second end surface 921 of the second section 920 on a third section 930 side is inclined at an acute angle with respect to the stage 300. The data generation unit 16 divides the second shape SP2 such that an inclination angle θ1 of the first end surface 911 with respect to the stage 300 is smaller than the inclination angle θn of a side surface of the nozzle 61 with respect to the stage 300. The data generation unit 16 divides the second shape SP2 such that an inclination angle θ2 of the second end surface 921 with respect to the stage 300 is the same as the inclination angle θ1 of the first end surface 911 with respect to the stage 300.

When it is determined in step S140 that the length Ls of the cut portion 903 along the X direction is not longer than the cuttable length Le of the cutting tool 210 in the X direction, the data generation unit 16 skips a processing of step S150 and advances the processing to a next processing.

Referring to FIG. 5, in step S160, the data generation unit 16 generates cross-section data by using the third shape data. The cross-section data is data representing a cross-sectional shape obtained when the third shape SP3 is cut along a plane parallel to the shaping surface 310 of the stage 300. The data generation unit 16 cuts the third shape SP3 at intervals corresponding to a thickness of one layer of the shaping material to be laminated on the stage 300 by the three-dimensional shaping device 10, and generates a plurality of pieces of the cross-section data. The thickness of one layer of the shaping material to be laminated on the stage 300 by the three-dimensional shaping device 10 is, for example, set by the user. When the third shape data is not generated due to skipping of step S150, the data generation unit 16 generates the cross-section data by using the second shape data.

Figure 9:
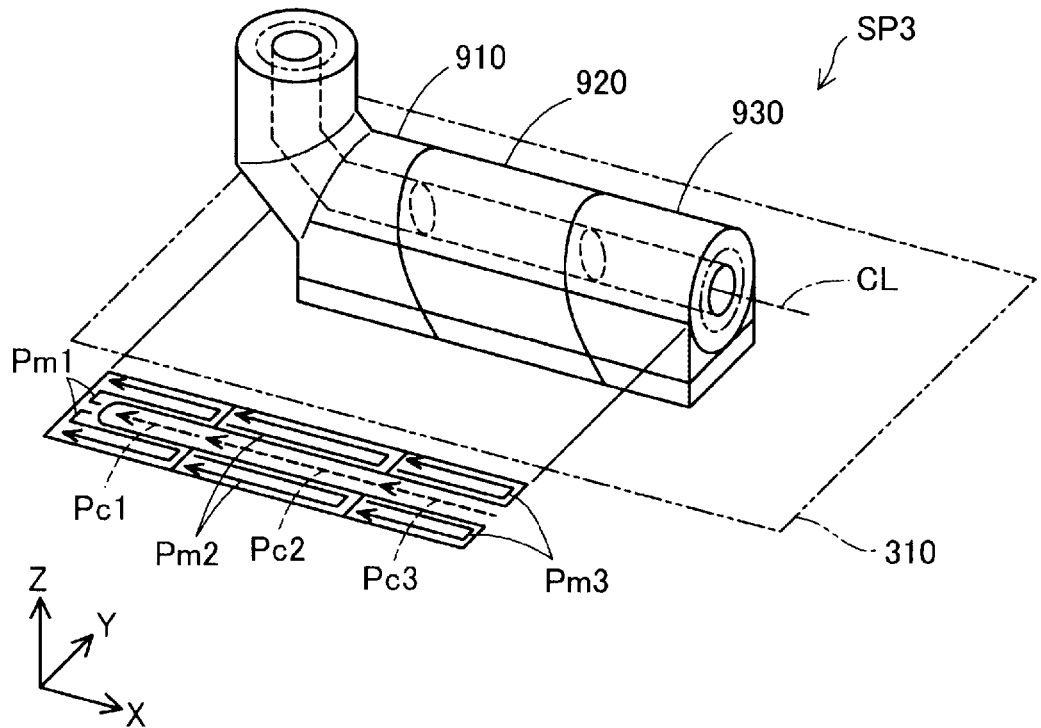
FIG. 9 is an illustrative diagram schematically illustrating a shaping path and a cutting path.

FIG. 9 is an illustrative diagram schematically illustrating a shaping path and a cutting path that are generated by the data generation unit 16. In FIG. 9, the shaping path is indicated by a solid line, and the cutting path is indicated by a broken line. Referring to FIGS. 5 and 9, in step S170, the data generation unit 16 uses the cross-section data to generate the shaping path for forming the three-dimensional shaped object OB, and uses the third shape data to generate the cutting path. The shaping path is a scanning path of the nozzle 61 with respect to the stage 300, the nozzle 61 moving while discharging the shaping material. The cutting path is a scanning path of the cutting tool 210 with respect to the stage 300, the cutting tool 210 moving while cutting the laminated shaping material. In the present embodiment, the data generation unit 16 generates a first shaping path Pm1 for shaping the first section 910, a second shaping path Pm2 for shaping the second section 920, a third shaping path Pm3 for shaping the third section 930, a first cutting path Pc1 for cutting the first section 910, a second cutting path Pc2 for cutting the second section 920, and a third cutting path Pc3 for cutting the third section 930.

Referring to FIG. 5, in step S180, the data generation unit 16 generates and outputs the shaping data and the cutting data. In addition to the shaping path described above, the shaping data includes information on, for example, a discharge amount that is a flow rate of the shaping material discharged from the nozzle 61, a rotation speed of the drive motor 32 that rotates the flat screw 40, the temperature of the heater 58 of the barrel 50, and the temperature of the reheating unit 70, all of which are set by the user. In addition to the cutting path described above, the cutting data includes information on, for example, a rotation speed of the cutting tool 210 and a feed speed of the cutting tool 210, which are set by the user. The data generation unit 16 generates and outputs shaping data and cutting data represented by, for example, a G code, and an M code.

In the present embodiment, the shaping data and the cutting data are represented in one piece of data. The data includes a first shaping data portion for shaping the first section 910, a first cutting data portion for cutting the first section 910, a second shaping data portion for shaping the second section 920, a second cutting data portion for cutting the second section 920, a third shaping data portion for shaping the third section 930, and a third cutting data portion for cutting the third section 930. The first shaping data portion, the first cutting data portion, the second shaping data portion, the second cutting data portion, the third shaping data portion, and the third cutting data portion are set in this order.

Figure 10:
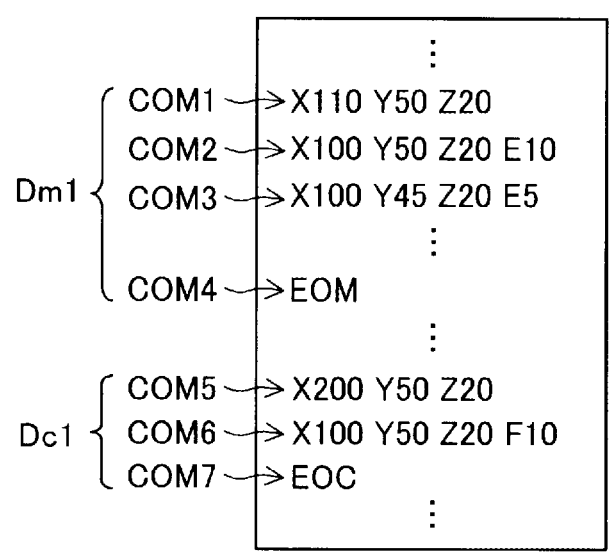
FIG. 10 is an illustrative diagram schematically illustrating shaping data and cutting data.

FIG. 10 is an illustrative diagram schematically illustrating the shaping data and the cutting data according to the present embodiment. The shaping data is read and interpreted in an order from top to bottom in FIG. 10. FIG. 10 illustrates a first shaping data portion Dm1 and a first cutting data portion Dc1. In the first shaping data portion Dm1, a command COM1 for moving the nozzle 61 to coordinates (X, Y, Z)=(110, 50, 20) is set. The coordinates indicate a position of the nozzle 61 relative to the stage 300. The nozzle 61 is moved from the coordinates (X, Y, Z)=(110, 50, 20) to coordinates (X, Y, Z)=(100, 50, 20), and a command COM2 for discharging 10 unit amounts of the shaping material from the nozzle 61 is set while the nozzle 61 is being moved across this segment. The nozzle 61 is moved from the coordinates (X, Y, Z)=(100, 50, 20) to coordinates (X, Y, Z)=(100, 45, 20), and a command COM3 for discharging 5 unit amounts of the shaping material from the nozzle 61 is set while the nozzle 61 is being moved across this segment. Thereafter, a command COM4 for ending the shaping of the first section 910 is set, with a mid-flow omitted. In the first cutting data portion Dc1, a command COM5 for moving the cutting tool 210 to coordinates (X, Y, Z)=(200, 50, 20) is set. A command COME for moving the cutting tool 210 from the coordinates (X, Y, Z)=(200, 50, 20) to coordinates (X, Y, Z)=(100, 50, 20) ata feed speed of 10 unit amounts is set. Thereafter, a command COM7 for ending the cutting of the first section 910 is set.

Figure 11:
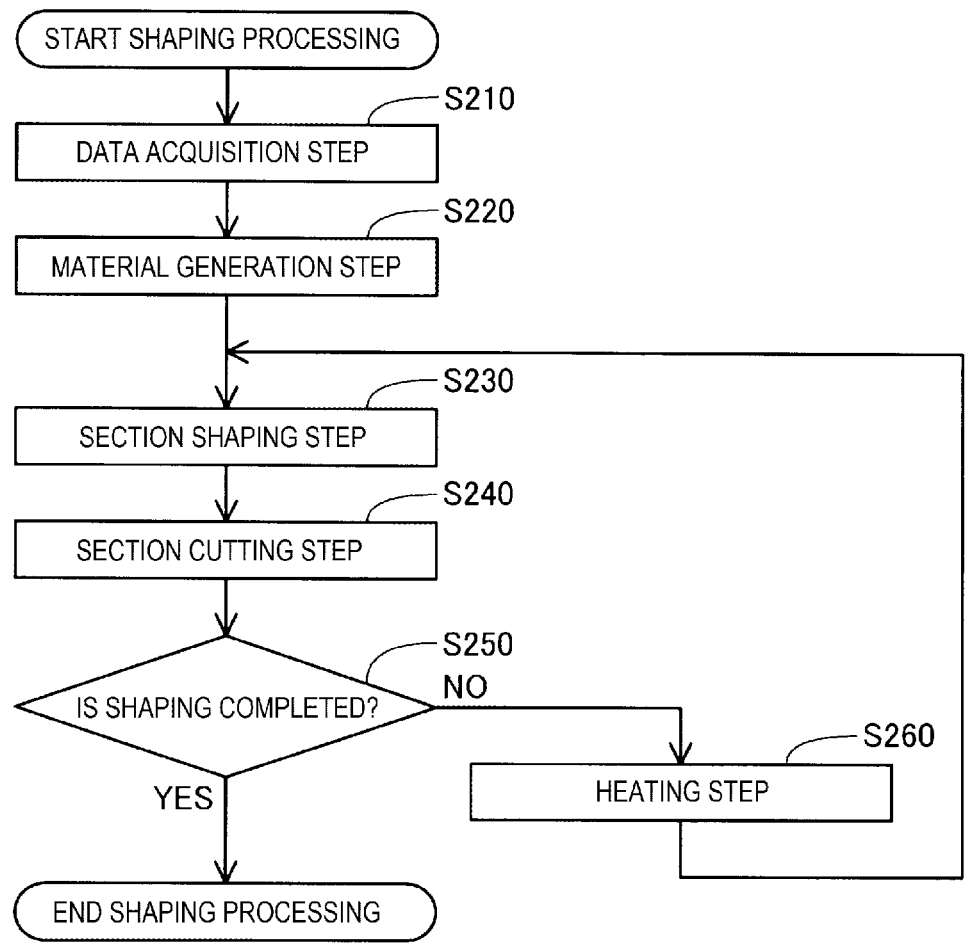
FIG. 11 is a flowchart illustrating contents of a shaping processing according to the first embodiment.

FIG. 11 is a flowchart illustrating contents of a shaping processing for implementing manufacturing of the three-dimensional shaped object OB according to the present embodiment. This processing is executed by the control unit 500 of the three-dimensional shaping device 10, when the user performs a predetermined start operation on an operation panel provided in the three-dimensional shaping device 10 or on the information processing device 15 connected to the three-dimensional shaping device 10.

First, in a data acquisition step of step S210, the control unit 500 acquires the shaping data and the cutting data from the information processing device 15. In the present embodiment, the control unit 500 acquires the shaping data and the cutting data from the information processing device 15 through wired communication. The control unit 500 may acquire the shaping data and the cutting data from the information processing device 15 through wireless communication, or may acquire the shaping data and the cutting data from the information processing device 15 via a recording medium such as a USB memory.

Next, in a material generation step of step S220, the control unit 500 controls the rotation of the flat screw 40 and the temperature of the heater 58 built in the barrel 50 to melt the material to generate the shaping material. This control is also referred to as material generation control. In the material generation step, the material accommodated in the material supply unit 20 is supplied, via the supply path 22, from the side surface 43 of the rotating flat screw 40 to the material introduction portion 48. The material supplied into the material introduction portion 48 is transported into the vortex portion 47 by the rotation of the flat screw 40. By the rotation of the flat screw 40 and heating of the heater 58, at least a part of the material transported into the vortex portion 47 is melted, and a paste-like shaping material having fluidity is generated. The generated shaping material is transported toward the central portion 46 in the vortex portion 47, and is supplied from the communication hole 56 to the nozzle 61. The shaping material is continuously generated while a shaping step to be described below is being performed.

In a section shaping step of step S230, the control unit 500 controls the discharge unit 100 and the moving mechanism 400 in accordance with the shaping data to shape a laminated body obtained by laminating the shaping material on the stage 300. A length of the laminated body along the X direction is shorter than the cuttable length Le of the cutting tool 210 in the X direction. This control is referred to as section shaping control. The control unit 500 performs the section shaping control. Accordingly, the shaping material is discharged from the nozzle 61 to the stage 300 while a relative position between the nozzle 61 of the discharge unit 100 and the stage 300 is being changed, thereby shaping the laminated body on the stage 300. Laminating the shaping material means further disposing the shaping material over a previously disposed shaping material. In addition, laminating the shaping material means that the shaping material is continuously disposed. For example, when the shaping material is continuously disposed on the stage 300 by continuously discharging the shaping material from the nozzle 61, a part of the shaping material disposed in contact with the stage 300 is referred to as a first layer, and a part of the shaping material disposed on the first layer is referred to as a second layer.

In a section cutting step of step S240, the control unit 500 controls the cutting unit 200 and the moving mechanism 400 in accordance with the cutting data to cut, by using the cutting tool 210, the cutting margin provided in the laminated body along the X direction. This control is referred to as section cutting control. The control unit 500 performs the section cutting control. Accordingly, the rotating cutting tool 210 is brought into contact with the cutting margin of the laminated body while a relative position between the cutting tool 210 and the stage 300 is being changed, thereby processing the laminated body to a desired size or surface roughness.

In step S250, the control unit 500 determines whether formation of the three-dimensional shaped object OB is completed. "After the formation of the three-dimensional shaped object OB is completed" means "after the shaping of the three-dimensional shaped object OB is completed following the shaping path represented by the shaping data and after the cutting of the three-dimensional shaped object OB is completed following the cutting path represented by the cutting data". The control unit 500 can use the shaping data and the cutting data to determine whether the formation of the three-dimensional shaped object OB is completed.

When it is determined in step S250 that the formation of the three-dimensional shaped object OB is completed, the control unit 500 ends this processing. On the other hand, when it is determined in step S250 that the formation of the three-dimensional shaped object OB is not completed, the control unit 500 controls the temperature of the reheating unit 70 to heat an end surface of the laminated body in a heating step of step S260. This control is referred to as heating control. The control unit 500 performs the heating control, to use the reheating unit 70 to heat the end surface of the laminated body for a predetermined time. A heating time is set according to a type of the material and the temperature of the reheating unit 70. For example, the control unit 500 sets the heating time by using a map showing a relationship between the temperature of the reheating unit 70 and the heating time. This map can be set by examining, through a test performed in advance, a time for the temperature of the end surface of the laminated body to reach a predetermined temperature higher than a glass transition point of the material. Instead of the map, the control unit 500 may set the heating time by using a function showing the relationship between the temperature of the reheating unit 70 and the heating time.

After the heating step of step S260, the control unit 500 returns the processing to step S230, and repeats the processings from step S230 to step S250. The control unit 500 repeats the heating step of step S260, the section shaping step of step S230, and the section cutting step of step S240 until it is determined in step S250 that the formation of the three-dimensional shaped object OB is completed. Accordingly, a three-dimensional shaped object OB having laminated bodies coupled to each other along the X direction and having a length along the X direction longer than the cuttable length Le of the cutting tool 210 in the X direction is shaped.

Figure 12:
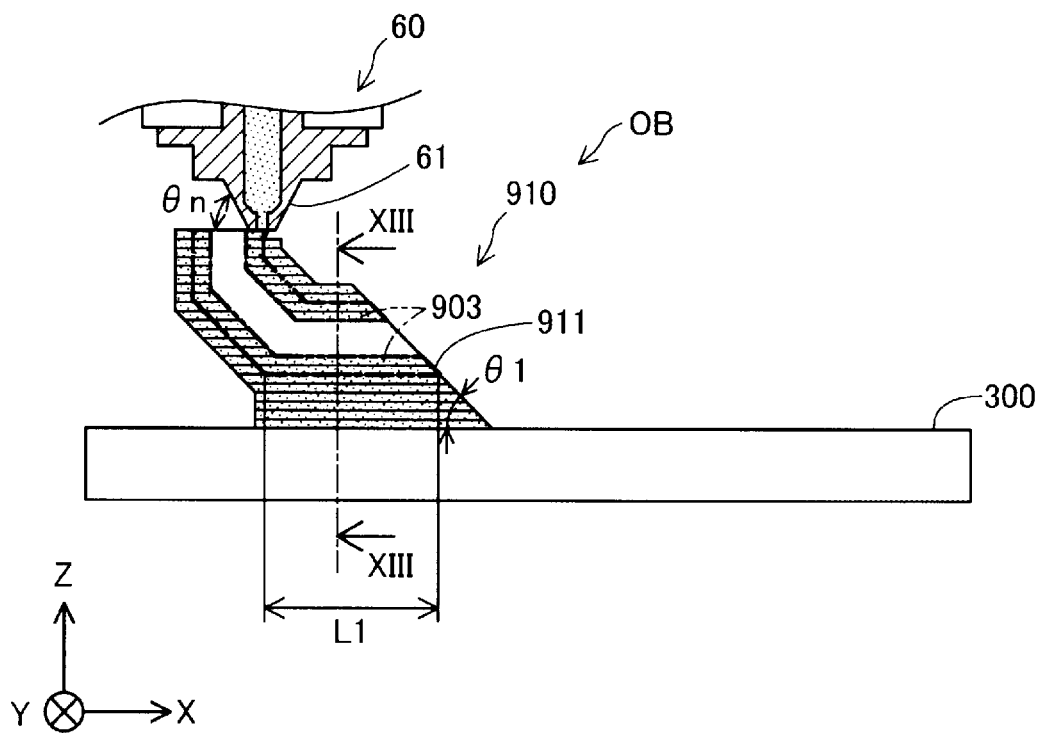
FIG. 12 is a diagram illustrating a first section shaping step according to the first embodiment.

FIG. 12 is a diagram illustrating a first section shaping step according to the present embodiment. The first section shaping step means a section shaping step for the first time. In FIG. 12, the cut portion 903 is indicated by a two-dot chain line. In the first section shaping step, the control unit 500 performs the section shaping control of step S230 in accordance with the shaping data. Accordingly, the shaping material is laminated on the stage 300, and a laminated body is shaped whose length L1 of the cut portion 903 along the X direction is shorter than the cuttable length Le of the cutting tool 210 in the X direction. The laminated body shaped in the first section shaping step is the first section 910. The first section 910 may be referred to as a first laminated body. The first section 910 has the first end surface 911 that is an end surface on a side to which the second section 920 is coupled in a second section shaping step to be described below. The inclination angle θ1 of the first end surface 911 with respect to the stage 300 is smaller than the inclination angle θn of the side surface of the nozzle 61 with respect to the stage 300. The first section 910 shaped on the stage 300 is deprived of heat by the stage 300 and the atmosphere, and is then cured.

Figure 13:
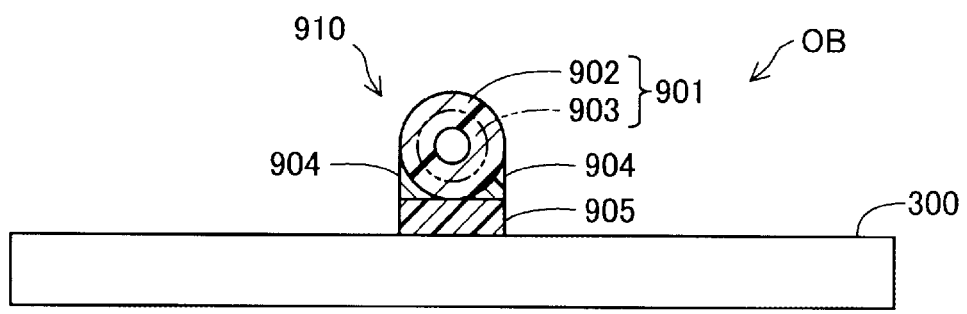
FIG. 13 is a cross-sectional view of a first section along a line XIII-XIII.

FIG. 13 is a cross-sectional view of the first section 910 along a line XIII-XIII. The first section 910 includes the shaping portion 901, the support portion 904, and the rising portion 905. In FIG. 13, different types of hatching are applied to the shaping portion 901, the support portion 904, and the rising portion 905. The shaping portion 901 includes the main body portion 902 and the cut portion 903. The support portion 904 is removed after the shaping processing is completed. In the present embodiment, the support portion 904 is provided to support a lower surface of an outer peripheral portion of the shaping portion 901. The rising portion 905 is removed after the shaping process is completed. In the present embodiment, the rising portion 905 is provided between the stage 300 and the lower surfaces of the shaping portion 901 and the support portion 904.

Figure 14:
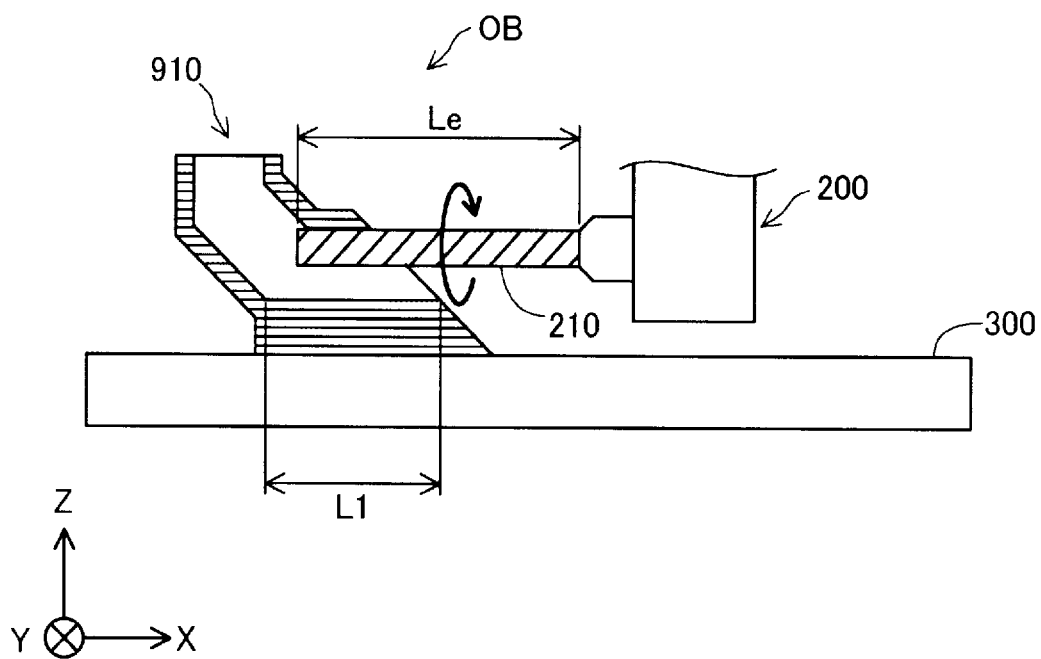
FIG. 14 is a diagram illustrating a first section cutting step according to the first embodiment.

FIG. 14 is a diagram illustrating a first section cutting step according to the present embodiment. The first section cutting step means a section cutting step for the first time. In the first section cutting step, the control unit 500 performs the section cutting control of step S240 to cut the cut portion 903 of the first section 910. In the present embodiment, the control unit 500 causes the cutting tool 210 to be inserted into a hollow portion of the first section 910 having a tube shape with a rotation axis of the cutting tool 210 aligned along the X direction, and causes the rotating cutting tool 210 to be brought into contact with the cut portion 903 of the first section 910 to cut the cut portion 903 of the first section 910.

Figure 15:
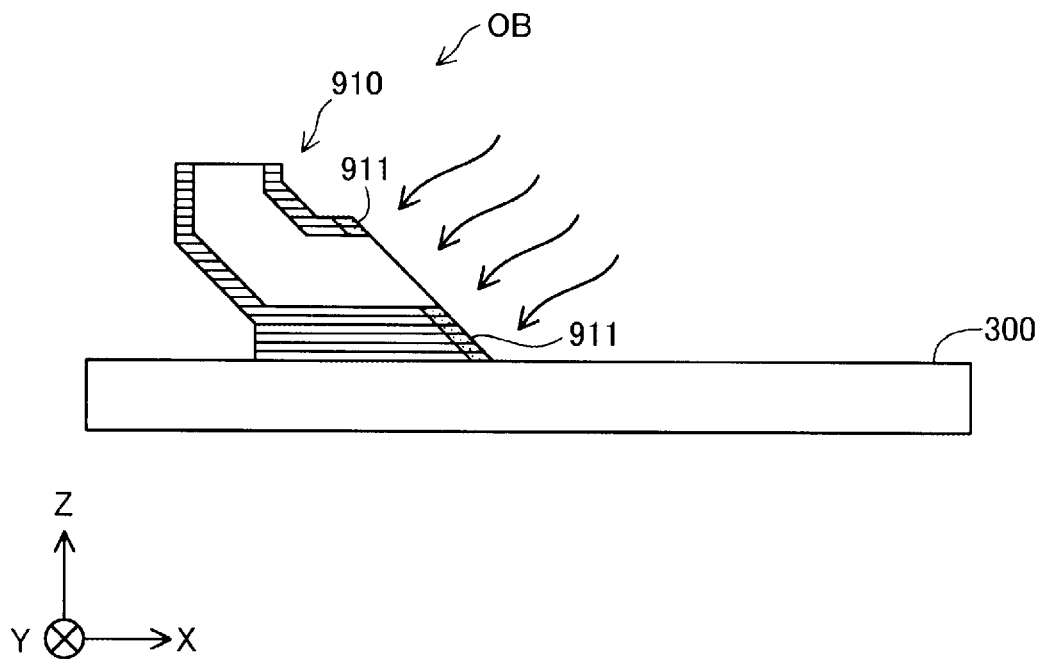
FIG. 15 is a diagram illustrating a first heating step according to the first embodiment.

FIG. 15 is a diagram illustrating a first heating step according to the present embodiment. The first heating step means a heating step for the first time. In the first heating step, the control unit 500 performs the heating control of step S260 to heat the first end surface 911 of the first section 910. The control unit 500 controls the temperature of the reheating unit 70 in accordance with the shaping data to heat the first end surface 911.

Figure 16:
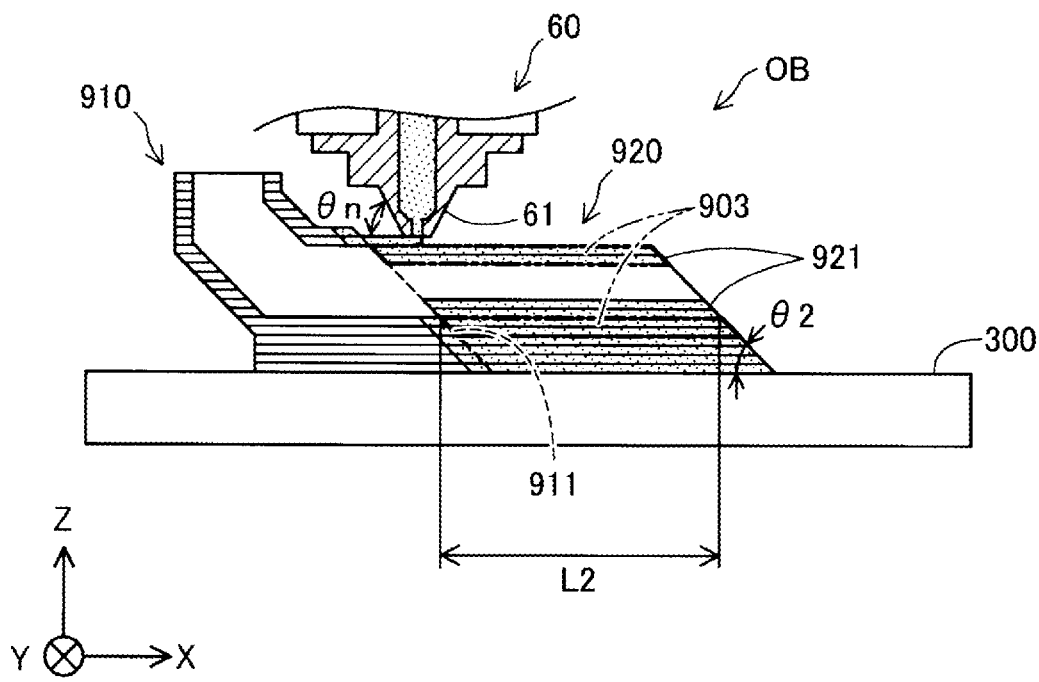
FIG. 16 is a diagram illustrating a second section shaping step according to the first embodiment.

FIG. 16 is a diagram illustrating a second section shaping step according to the present embodiment. The second section shaping step means a section shaping step for the second time. In FIG. 16, the cut portion 903 is indicated by a two-dot chain line. In the second section shaping step, the control unit 500 performs the section shaping control of step S230 in accordance with the shaping data. Accordingly, the shaping material is laminated on the stage 300, and a laminated body is shaped whose length L2 of the cut portion 903 along the X direction is shorter than the cuttable length Le of the cutting tool 210 in the X direction. The laminated body shaped in the second section shaping step is the second section 920. The second section 920 may be referred to as a second laminated body. The second section 920 has the second end surface 921 that is an end surface on a side to which the third section 930 is coupled in a third section shaping step to be described below. The inclination angle θ2 of the second end surface 921 with respect to the stage 300 is smaller than the inclination angle θn of the side surface of the nozzle 61 with respect to the stage 300. The second section 920 shaped on the stage 300 is deprived of heat by the stage 300, the first section 910 and the atmosphere, and is then cured.

Figure 17:
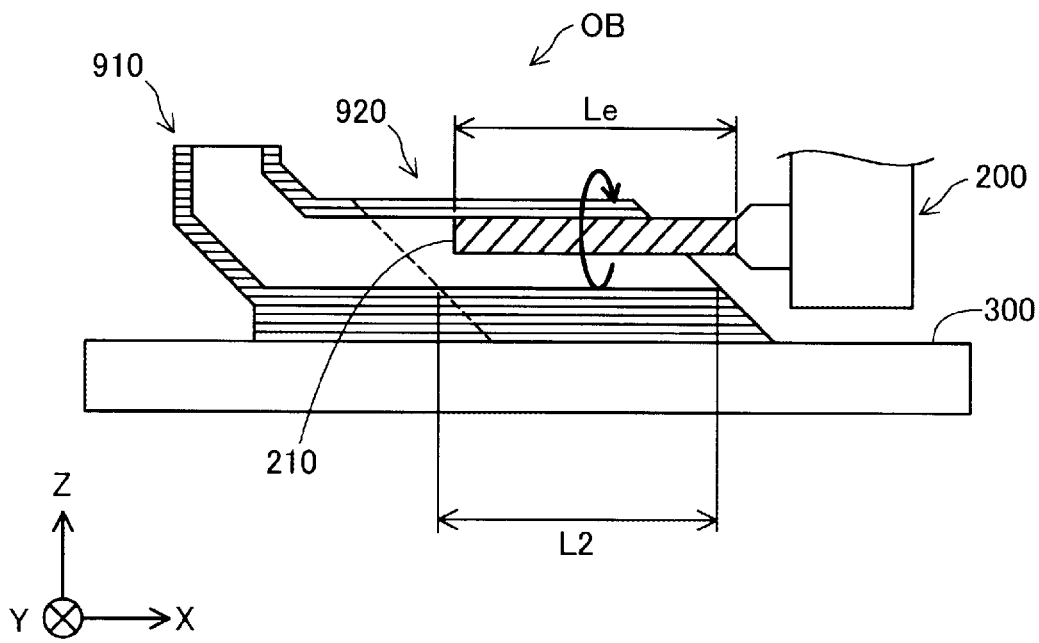
FIG. 17 is a diagram illustrating a second section cutting step according to the first embodiment.

FIG. 17 is a diagram illustrating a second section cutting step according to the present embodiment. The second section cutting step means a section cutting step for the second time. In the second section cutting step, the control unit 500 performs the section cutting control of step S240 to cut the cut portion 903 of the second section 920. In the present embodiment, the control unit 500 causes the cutting tool 210 to be inserted into the hollow portion of the second section 920 having a tube shape with the rotation axis of the cutting tool 210 aligned along the X direction, and causes the rotating cutting tool 210 to be brought into contact with the cut portion 903 of the second section 920 to cut the cut portion 903 of the second section 920.

Figure 18:
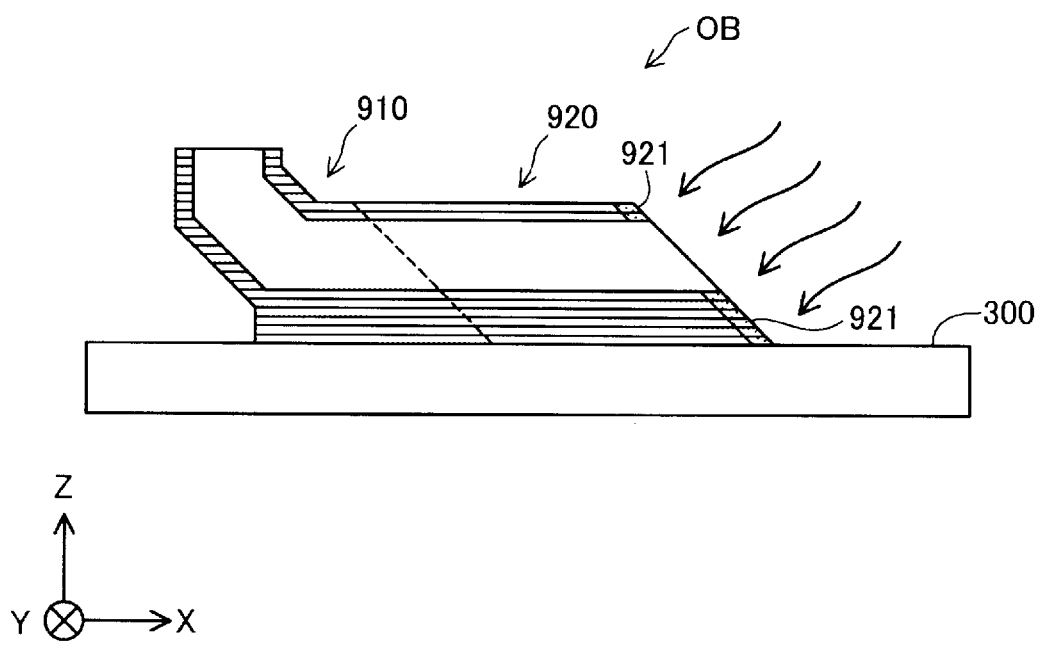
FIG. 18 is a diagram illustrating a second heating step according to the first embodiment.

FIG. 18 is a diagram illustrating a second heating step according to the present embodiment. The second heating step means a heating step for the second time. In the second heating step, the control unit 500 performs the heating control of step S260 to heat the second end surface 921 of the second section 920. The control unit 500 controls the temperature of the reheating unit 70 in accordance with the shaping data to heat the second end surface 921.

Figure 19:
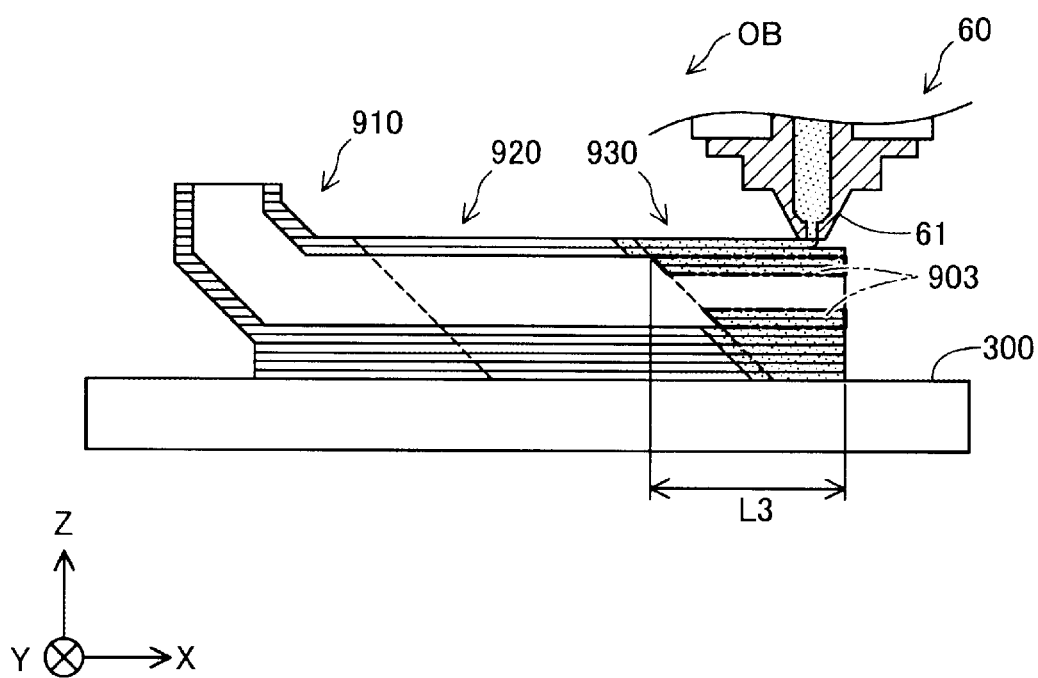
FIG. 19 is a diagram illustrating a third section shaping step according to the first embodiment.

FIG. 19 is a diagram illustrating a third section shaping step according to the present embodiment. The third section shaping step means a section shaping step for the third time. In FIG. 19, the cut portion 903 is indicated by a two-dot chain line. In the third section shaping step, the control unit 500 performs the section shaping control of step S230. Accordingly, a laminated body is shaped, which has a length L3 along the X direction shorter than the cuttable length Le of the cutting tool 210 in the X direction and which is coupled to the second end surface 921 of the second section 920 along the X direction. The laminated body shaped in the third section shaping step is the third section 930. The third section 930 may be referred to as a third laminated body. The third section 930 shaped on the stage 300 is deprived of heat by the stage 300, the second section 920 and the atmosphere, and is then cured.

Figure 20:
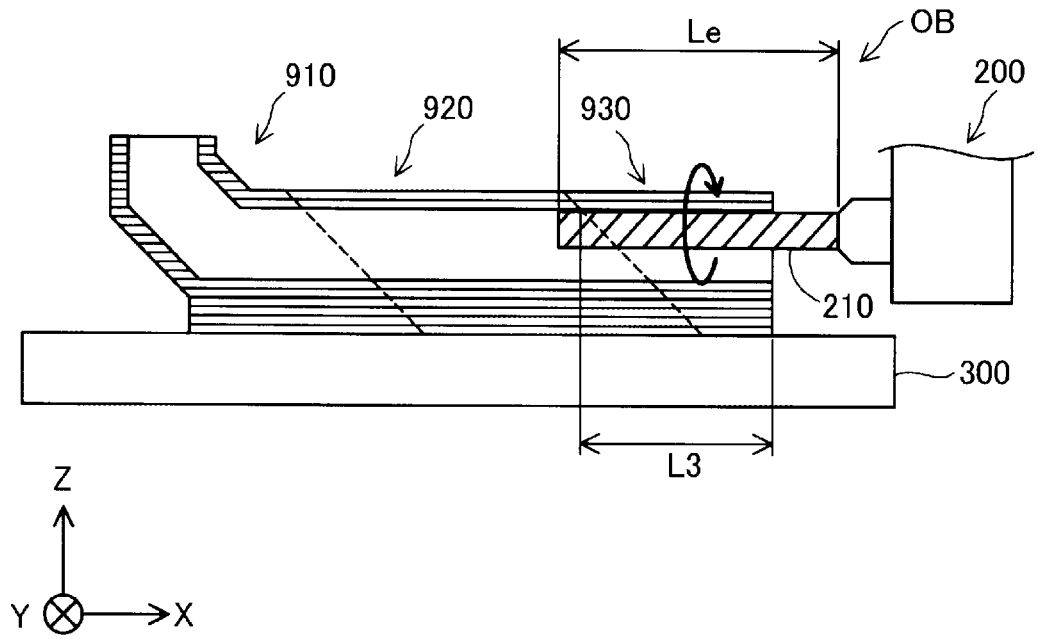
FIG. 20 is a diagram illustrating a third section cutting step according to the first embodiment.

FIG. 20 is a diagram illustrating a third section cutting step according to the present embodiment. The third section cutting step means a section cutting step for the third time. In the third section cutting step, the control unit 500 performs the section cutting control of step S240 to cut the cut portion 903 of the third section 930. In the present embodiment, the control unit 500 causes the cutting tool 210 to be inserted into the hollow portion of the second section 930 having a tube shape with the rotation axis of the cutting tool 210 aligned along the X direction, and causes the rotating cutting tool 210 to be brought into contact with the cut portion 903 of the third section 930 to cut the cut portion 903 of the third section 930.

In the present embodiment, the control unit 500 ends the shaping processing after the third section cutting step. After the shaping processing is completed, the user separates the three-dimensional shaped object OB from the stage 300, removes the support portion 904 and the rising portion 905, sinters the three-dimensional shaped object OB in a furnace, and finishes the three-dimensional shaped object OB according to a design shape.

According to the method for shaping the three-dimensional shaped object OB of the present embodiment described above, the control unit 500 forms a three-dimensional shaped object OB, having a part of the cut portion 903 left uncut because the cutting tool 210 cannot reach the part when the cutting process is performed immediately after the shaping material is laminated, by dividing the three-dimensional shaped object OB into the first section 910, the second section 920, and the third section 930. Therefore, a three-dimensional shaped object OB having a desired shape can be formed without leaving the cut section 903. Therefore, the degree of freedom of shaping a three-dimensional shaped object that can be formed by lamination and the cutting process of a shaping material can be improved. In particular, in the present embodiment, since the length Ls along the X direction of the cut portion 903 provided on the inner wall surface 825 of the three-dimensional shaped object OB is longer than the cuttable length Le of the cutting tool 210 in the X direction, a part of the cut portion 903 is left uncut on the inner wall surface 825 because the cutting tool 210 cannot reach the part when the cutting process is performed immediately after the shaping material is laminated. Therefore, the control unit 500 divides the three-dimensional shaped object OB into the first section 910, the second section 920, and the third section 930 for formation, such that the length L1 of the cut portion 903 along the X direction in the first section 910, the length L2 of the cut portion 903 along the X direction in the second section 920, and the length L3 of the cut portion 903 along the X direction in the third section 930 are shorter than the cuttable length Le of the cutting tool 210 in the X direction. Therefore, the three-dimensional shaped object OB having a desired shape can be formed without leaving the cut portion 903 on the inner wall surface 825.

In the present embodiment, the control unit 500 shapes the first section 910 in the first section shaping step, with the inclination angle θ1 of the first end surface 911 with respect to the stage 300 smaller than the inclination angle θn of the side surface of the nozzle 61 with respect to the stage 300, and shapes the second section 920 in the second section shaping step, with the inclination angle θ2 of the second end surface 921 with respect to the stage 300 smaller than the inclination angle θn of the side surface of the nozzle 61 with respect to the stage 300. Therefore, the interference between the first section 910 and the nozzle 61 in the second section shaping step and the interference between the second section 920 and the nozzle 61 in the third section shaping step can be prevented.

In the present embodiment, the control unit 500 performs the first heating step of heating the first end surface 911 of the first section 910 between the first section cutting step and the second section shaping step, and performs the second heating step of heating the second end surface 921 of the second section 920 between the second section cutting step and the third section shaping step. Therefore, adhesion between the first section 910 and the second section 920 and adhesion between the second section 920 and the third section 930 can be improved. Therefore, mechanical strength of the three-dimensional shaped object OB formed by being divided into the first section 910 to the third section 930 can be improved.

In the present embodiment, the control unit 500 shapes the rising portion 905 between the shaping portion 901 and the stage 300 in each section shaping step. Therefore, interference between the cutting unit 200 and the stage 300 in each section cutting step can be prevented.

A pellet-like ABS resin material is used in the present embodiment, and as a material used in the discharge unit 100, for example, a material for shaping a three-dimensional shaped object using various materials such as a thermoplastic material, a metal material, or a ceramic material as a main material may be employed. Here, the "main material" means a main material for forming the shape of the three-dimensional shaped object, and means a material that occupies 50% or more by weight in the three-dimensional shaped object. The shaping material described above includes a material obtained by melting each main material alone, or a material obtained by melting the main material and a part of components into a paste form.

When a thermoplastic material is used as the main material, the shaping material is generated by plasticizing the thermoplastic material in the melting unit 30. "Plasticizing" means applying heat to the thermoplastic material to melt the thermoplastic material.

As the thermoplastic material, for example, any one thermoplastic resin material or a combination of two or more thermoplastic resin materials listed below can be used.

Example of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polycarbonate (PC), modified polyphenylene ether, polybutylene terephthalate, or polyethylene terephthalate, and engineering plastics such as polysulfone, polyether sulfone, polyphenylene sulfide, polyarylate, polyimide, polyamide-imide, polyetherimide, or polyether ether ketone (PEEK)

Additives such as a wax, a flame retardant, an antioxidant, or a heat stabilizer may be mixed into the thermoplastic material, in addition to a pigment, a metal and a ceramic. The thermoplastic material is converted into a melted state after being plasticized in the melting unit 30 by the rotation of the flat screw 40 and the heating of the heater 58. The shaping material generated in such a manner is discharged from the nozzle hole 62 and thereafter is cured due to a low temperature.

It is desired that the thermoplastic material is injected from the nozzle hole 62 in a completely melted state after being heated to the glass transition point or higher. For example, the ABS resin has a glass transition point of about 120° C., and is desired to be at about 200° C. when being injected from the nozzle hole 62. In order to inject the shaping material in a high-temperature state as described, a heater may be provided around the nozzle hole 62.

In the discharge unit 100, instead of the thermoplastic material described above, for example, the following metal materials may be used as the main material. In this case, it is desired that a powder material obtained by forming the following metal materials into a powder form is mixed with a component that melts when generating the shaping material, and the mixture is put into the melting unit 30.

Example of Metal Material

Magnesium (Mg), iron (Fe), cobalt (Co), chromium (Cr), aluminum (Al), titanium (Ti), copper (Cu), nickel (Ni), or an alloy containing one or more of these metals Example of Alloy Maraging steel, stainless steel, cobalt chromium molybdenum, titanium alloy, nickel alloy, aluminum alloy, cobalt alloy, or cobalt chromium alloy In the discharge unit 100, instead of the metal materials described above, a ceramic material can be used as the main material. As the ceramic material, for example, an oxide ceramic such as silicon dioxide, titanium dioxide, aluminum oxide and zirconium oxide, and a non-oxide ceramic such as aluminum nitride can be used. When the metal material or the ceramic material as described above is used as the main material, the shaping material disposed on the stage 300 may be cured by, for example, being irradiated with a laser and being sintered with hot air or the like.

A powder material of the metal material or the ceramic material that is put into the material supply unit 20 may be a mixed material obtained by mixing a plurality of powders of single metals, a plurality of powders of alloys and a plurality of powders of ceramic materials. The powder material of the metal material or the ceramic material may be coated with, for example, a thermoplastic resin as exemplified above, or a thermoplastic resin other than the above thermoplastic resin. In this case, in the melting unit 30, the thermoplastic resin may be melted to exhibit fluidity.

For example, the following solvents may be added to the powder material of the metal material or the ceramic material that is put into the material supply unit 20. One solvent or a combination of two or more solvents selected from the following solvents may be used.

Example of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (such as tetrabutylammonium acetate); and ionic liquids such as butyl carbitol acetate In addition, the following binders, for example, may be added to the powder material of the metal material or the ceramic material that is put into the material supply unit 20.

Example of Binder

Acrylic resin, epoxy resin, silicone resin, cellulose-based resin or other synthetic resins, and polylactic acid (PLA), polyamide (PA), polyphenylene sulfide (PPS), polyether ether ketone (PEEK) or other thermoplastic resins B. Other Embodiments (B1) In the embodiment described above, the control unit 500 uses the reheating unit 70 to heat the first end surface 911 of the first section 910 in the first heating step, and the control unit 500 uses the reheating unit 70 to heat the second end surface 921 of the second section 920 in the second heating step. Alternatively, the first heating step and the second heating step may not be performed.

(B2) In the embodiment described above, the control unit 500 uses the reheating unit 70 to heat the first end surface 911 of the first section 910 for a predetermined time in the first heating step, and the control unit 500 uses the reheating unit 70 to heat the second end surface 921 of the second section 920 for a predetermined time in the second heating step. Alternatively, in each heating step, the control unit 500 may use the reheating unit 70 to heat the end surfaces 911 and 921 until the end surfaces 911 and 921 reach a predetermined temperature. For example, the control unit 500 may acquire temperatures of the end surfaces 911 and 921 by using a temperature sensor, and stop the heating of the reheating unit 70 when the acquired temperatures reach the predetermined temperature equal to or higher than the glass transition point of the material. In this case, the adhesion between the sections 910 to 930 can be more reliably improved. As the temperature sensor, for example, a contact thermometer such as a thermocouple or a non-contact thermometer such as an infrared thermometer can be used. The predetermined temperature is set in advance according to the type of the material.

(B3) In the present embodiment described above, the control unit 500 shapes the first section 910 in the first section shaping step, with the inclination angle θ1 of the first end surface 911 with respect to the stage 300 smaller than the inclination angle θn of the side surface of the nozzle 61 with respect to the stage 300, and shapes the second section 920 in the second section shaping step, with the inclination angle θ2 of the second end surface 921 with respect to the stage 300 smaller than the inclination angle θn of the side surface of the nozzle 61 with respect to the stage 300. Alternatively, in each section shaping step, the control unit 500 may shape the sections 910 and 920, with the inclination angles of the end surfaces 911 and 921 with respect to the stage 300 equal to or larger than the inclination angle θn of the side surface of the nozzle 61 with respect to the stage 300. In this case, for example, the cutting process is performed in the first cutting step with the inclination angle θ1 of the first end surface 911 with respect to the stage 300 smaller than the inclination angle θn of the side surface of the nozzle 61 with respect to the stage 300, so that the interference between the first section 910 and the nozzle 61 in the second section shaping step can be prevented. Further, the cutting process is performed in the second cutting step with the inclination angle θ2 of the second end surface 921 with respect to the stage 300 smaller than the inclination angle θn of the side surface of the nozzle 61 with respect to the stage 300, so that the interference between the second section 920 and the nozzle 61 in the third section shaping step can be prevented.

(B4) In the embodiment described above, the length Ls, along the X direction, of the cut portion 903 provided on the inner wall surface 825 of the three-dimensional shaped object OB is longer than the cuttable length Le of the cutting tool 210 in the X direction. Alternatively, the length Ls, along the X direction, of the cut portion 903 may be shorter than the cuttable length Le of the cutting tool 210 in the X direction.

(B5) In the embodiment described above, in the data generation processing, the data generation unit 16 divides the second shape SP2 such that the lengths L1 to L3 of the cut portion 903 of the respective sections 910 to 930 along the X direction are shorter than the cuttable length Le of the cutting tool 210 in the X direction. Alternatively, the data generation unit 16 may divide the shaping path such that the lengths L1 to L3 of the cut portion 903 of the respective sections 910 to 930 along the X direction are shorter than the cuttable length Le of the cutting tool 210 in the X direction. Even in this case, a three-dimensional shaped object OB, having a part of the cut portion 903 left uncut because the cutting tool 210 cannot reach the part when the cutting process is performed immediately after the shaping material is laminated, can be divided into the first section 910, the second section 920, and the third section 930.

Figure 21:
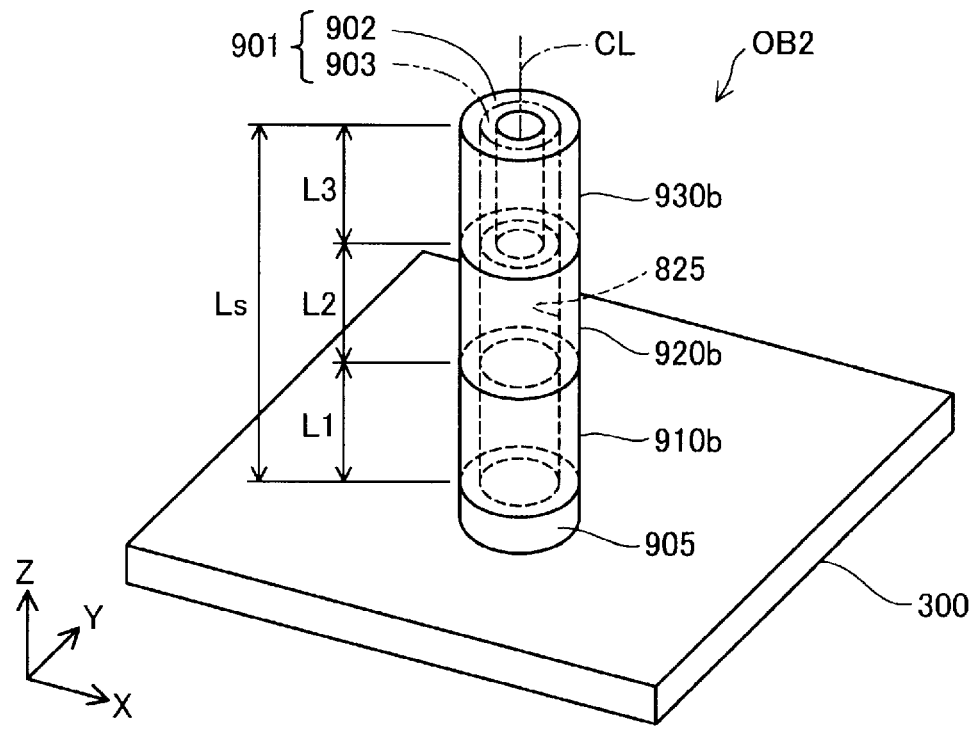
FIG. 21 is a first illustrative diagram illustrating a three-dimensional shaped object as another form.

(B6) FIG. 21 is an illustrative diagram illustrating a three-dimensional shaped object OB2 as another form. FIG. 21 illustrates the three-dimensional shaped object OB2 after the third section shaping step and before the third section cutting step. The three-dimensional shaped object OB2 has a linear tube shape. The three-dimensional shaped object OB2 is disposed on the stage 300 such that a center axis CL of the tube is parallel to the Z direction. In the three-dimensional shaped object OB2, the cut portion 903 is provided on the inner wall surface 825 of the tube. Since a length Ls, along the Z direction, of the cut portion 903 provided in the three-dimensional shaped object OB2 is longer than a cuttable length Le of the cutting tool 210 in the Z direction, a part of the cut portion 903 is left uncut because the cutting tool 210 cannot reach the part when the three-dimensional shaped object OB2 is formed by performing the cutting process immediately after the shaping material is laminated. Therefore, the control unit 500 forms the three-dimensional shaped object OB2 by dividing the three-dimensional shaped object OB2 into a first section 910b, a second section 920b, and a third section 930b, such that a length L1 of the cut portion 903 along the Z direction in the first section 910b, a length L2 of the cut portion 903 along the Z direction in the second section 920b, and a length L3 of the cut portion 903 along the Z direction in the third section 930b are shorter than the cuttable length Le of the cutting tool 210 in the Z direction. Therefore, the three-dimensional shaped object OB2 having a desired shape can be formed without leaving the cut portion 903.

Figure 22:
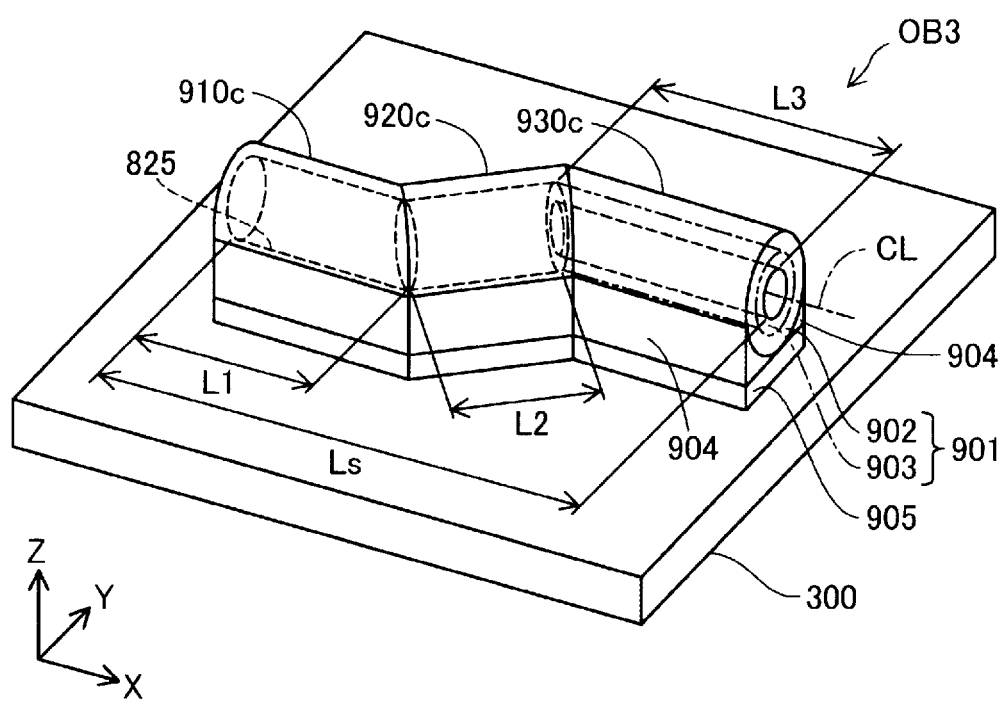
FIG. 22 is a second illustrative diagram illustrating a three-dimensional shaped object as another form.

(B7) FIG. 22 is an illustrative diagram illustrating a three-dimensional shaped object OB3 as yet another form. FIG. 22 illustrates the three-dimensional shaped object OB3 after the third section shaping step and before the third section cutting step. The three-dimensional shaped object OB3 has a bent tube shape. The three-dimensional shaped object OB3 is disposed on the stage 300 such that a center axis CL of the tube is parallel to the stage 300. The three-dimensional shaped object OB3 includes, in the order from one end portion, a section extending along a first direction parallel to the X direction, a section extending in a second direction intersecting the X direction and parallel to the stage 300, and a section extending in the first direction. In the three-dimensional shaped object OB3, the cut portion 903 is provided on the inner wall surface 825 of the tube. A length Ls, along the first direction, of the cut portion 903 provided in the three-dimensional shaped object OB3 is longer than the cuttable length Le of the cutting tool 210 in the first direction. Since the three-dimensional shaped object OB3 has a bent tube shape, a part of the cut portion 903 is left uncut because the cutting tool 210 cannot reach the part when the three-dimensional shaped object OB3 is formed by performing the cutting process immediately after the shaping material is laminated. Therefore, the control unit 500 forms the three-dimensional shaped object OB3 by dividing the three-dimensional shaped object OB3 into a first section 910c, a second section 920c, and a third section 930c, such that each of the first section 910c, the second section 920c, and the third section 930c is in a linear tube shape. At this time, the control unit 500 forms the three-dimensional shaped object OB3 by dividing the three-dimensional shaped object OB3 into the first section 910c, the second section 920c, and the third section 930c, such that a length L1 of the cut portion 903 along the first direction in the first section 910c shorter than the cuttable length Le of the cutting tool 210 in the first direction, a length L2 of the cut portion 903 along the second direction in the second section 920c shorter than the cuttable length Le of the cutting tool 210 in the second direction, and a length L3 of the cut portion 903 along the first direction in the third section 930c shorter than the cuttable length Le of the cutting tool 210 in the first direction. Therefore, the three-dimensional shaped object OB3 having a desired shape can be formed without leaving the cut portion 903.

Figure 23:
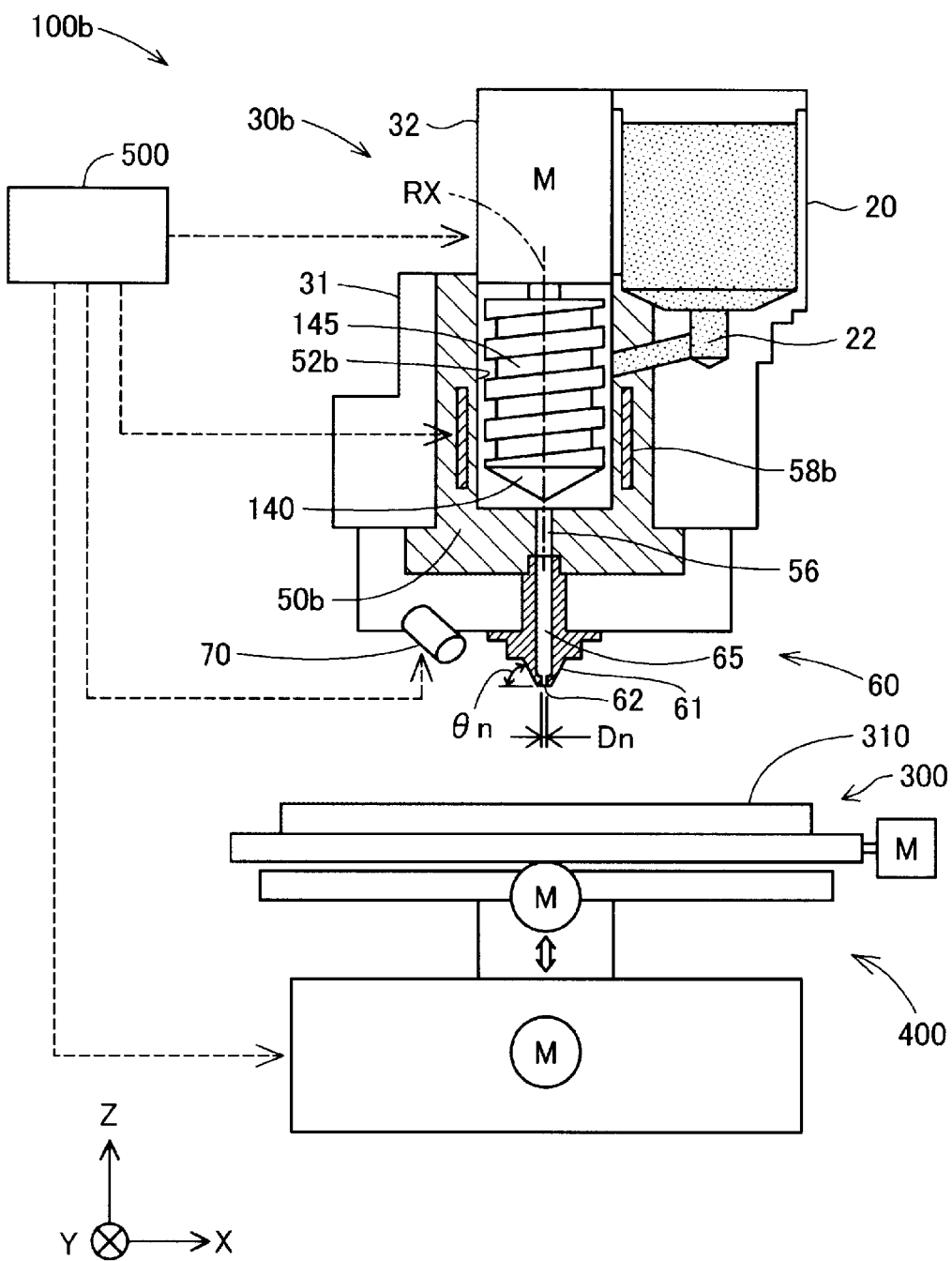
FIG. 23 is an illustrative diagram illustrating a schematic configuration of a discharge unit as another form.

(B8) FIG. 23 is an illustrative diagram illustrating a schematic configuration of a discharge unit 100b as another form. The discharge unit 100b may include a melting unit 30b including an in-line screw 140 and a barrel 50b. The in-line screw 140 has a substantially columnar shape whose length in a direction along a central axis RX is larger than a diameter thereof. The in-line screw 140 is disposed such that the central axis RX is parallel to the Z direction. A spiral groove portion 145 is provided on a columnar side surface of the in-line screw 140. The in-line screw 140 is rotated by the drive motor 32 coupled to an upper end portion thereof.

The barrel 50b has a cylindrical shape which covers an outer periphery of the in-line screw 140. In the barrel 50b, a screw facing surface 52b facing the in-line screw 140 is provided on a cylindrical inner wall surface. In the barrel 50b, a heater 58b is built at a position facing the groove portion 145 of the in-line screw 140. The communication hole 56 is provided on a cylindrical bottom surface of the barrel 50b, coinciding with the central axis RX of the in-line screw 140. Even in this form, the melting unit 30b can melt a material supplied from the material supply unit 20 to the groove portion 145 by rotation of the in-line screw 140 and heating of the heater 58b to generate a shaping material, and feed out the shaping material from the communication hole 56. The in-line screw 140 may simply be referred to as a screw. The heater 58b may be referred to as a heating unit.

C. Other Aspects

The present disclosure is not limited to the embodiments described above, and can be implemented in various forms without departing from the scope of the present disclosure. For example, the present disclosure can be implemented by the following forms. In order to solve some or all of the problems described in the present disclosure, or to achieve some or all of the effects of the present disclosure, technical features of the embodiments described above corresponding to technical features to be described below of the embodiments can be replaced or combined as appropriate. In addition, unless described as essential herein, the technical features can be deleted as appropriate.

(1) According to a first aspect of the present disclosure, there is provided a method for shaping a three-dimensional shaped object using a cutting tool configured to perform cutting at a first length at maximum in a predetermined cutting direction. The method for shaping a three-dimensional shaped object includes: a first section shaping step of shaping a first section having a length in a first direction shorter than the first length by laminating a shaping material; a first section cutting step of cutting the first section with the cutting tool having a cutting direction along the first direction; a second section shaping step of shaping a second section having a length in a second direction shorter than the first length by laminating the shaping material, to connect to a first end surface of the first section in the first direction; and a second section cutting step of cutting the second section along the second direction with the cutting tool having a cutting direction along the second direction.

According to the method for shaping a three-dimensional shaped object of this aspect, a three-dimensional shaping material, having a cutting margin left uncut because the cutting tool cannot reach the cutting margin when the cutting process is performed immediately after the shaping material is laminated, can be formed in a desired shape without leaving the cutting margin. Therefore, the degree of freedom of shaping a three-dimensional shaped object that can be formed by lamination and the cutting process of a shaping material can be improved.

(2) In the method for shaping a three-dimensional shaped object of the above aspect, the first direction and the second direction may be the same direction.

According to the method for shaping a three-dimensional shaped object of this aspect, the three-dimensional shaped object, in which the cutting margin is provided along the first direction, can be formed in a desired shape.

(3) In the method for shaping a three-dimensional shaped object of the above aspect, the first direction and the second direction may be different directions.

According to the method for shaping a three-dimensional shaped object of this aspect, a three-dimensional shaped object, having a part of the cutting margin left uncut because the cutting tool cannot reach the part when the cutting process is performed only from one direction, can be formed in a desired shape.

(4) In the method for shaping a three-dimensional shaped object of the above aspect, at least one of a combined length of the first section and the second section in the first direction and a combined length of the first section and the second section in the second direction may be longer than the first length.

According to the method for shaping a three-dimensional shaped object of this aspect, a three-dimensional shaped object, having a part of the cutting margin left uncut because the cutting tool cannot reach the part, can be formed in a desired shape because of having an elongated shape.

(5) In the method for shaping a three-dimensional shaped object of the above aspect, an inclination angle of the first end surface of the first section with respect to the stage, on which the shaping material is laminated, may be smaller than an inclination angle of a side surface of a nozzle, from which the shaping material is discharged, with respect to the stage.

According to the method for shaping a three-dimensional shaped object of this aspect, interference between the nozzle and the first section can be prevented when shaping the second section coupled to the first section.

(6) In the method for shaping a three-dimensional shaped object of the above aspect, a heating step may be provided in which the first end surface of the first section is heated before the second section shaping step.

According to the method for shaping a three-dimensional shaped object of this aspect, since adhesion between the first section and the second section can be improved, mechanical strength of the three-dimensional shaped object can be improved.

(7) In the method for shaping a three-dimensional shaped object of the above aspect, the first section may include a rising portion that is shaped in contact with the stage and that is for securing a distance between the stage and the cutting margin to be cut in the first section cutting step of the first section.

According to the method for shaping a three-dimensional shaped object of this aspect, interference between a device used for cutting and the stage can be prevented when the cutting process is performed on the first section.

The present disclosure may be implemented in various forms other than the method for shaping the three-dimensional shaped object. For example, the present disclosure can be implemented in the form of a three-dimensional shaping device, a three-dimensional shaping device control method, a data generation device, a data generation method, or the like.

What is claimed is:

1. A method for shaping a three-dimensional shaped object using a cutting tool configured to perform cutting at a first length at maximum in a predetermined cutting direction, the method comprising:
   generating cutting data, wherein the cutting data includes information on a rotation speed of the cutting tool and a feed speed of the cutting tool;
   shaping a first rising portion on a stage;
   shaping a first section having a tube shape in which an inner wall surface extends along a first direction, by laminating a shaping material in a laminating direction perpendicular to a shaping surface of the stage above the first rising portion, wherein
a portion of a length of the first section in the first direction is shorter than the first length,
the first direction corresponds to a direction along the shaping surface of the stage, and
an inclination angle of a first end surface of the first section with respect to the stage, on which the shaping material is laminated, is smaller than an inclination angle of a side surface of a nozzle, from which the shaping material is discharged, with respect to the stage;
cutting, based on the cutting data, the inner wall of the first section with the cutting tool having a cutting direction along the first direction;
heating, for a predetermined time, the first end surface of the first section after the cutting the inner wall of the first section;
shaping a second rising portion on the stage, wherein the second rising portion is shaped on the stage subsequent to the heating the first end surface;
shaping a second section having a tube shape in which an inner wall surface extends along a second direction, by laminating the shaping material in the laminating direction above the second rising portion and to connect to the first end surface of the first section in the first direction, wherein
a portion of a length of the second section in the second direction is shorter than the first length, and
the second direction corresponds to a direction along the shaping surface of the stage; and
cutting, based on the cutting data, the inner wall of the second section along the second direction with the cutting tool having a cutting direction along the second direction, wherein the predetermined time for heating the first end surface of the first section is set based on a type of the shaping material of the first section.

2. The method for shaping the three-dimensional shaped object according to claim 1, wherein the first direction and the second direction are the same direction.

3. The method for shaping the three-dimensional shaped object according to claim 1, wherein the first direction and the second direction are different directions.

4. The method for shaping the three-dimensional shaped object according to claim 1, wherein at least one of a combined length of the inner wall of the first section and the inner wall of the second section in the first direction and a combined length of the inner wall of the first section and the inner wall of the second section in the second direction is longer than the first length.

5. The method for shaping the three-dimensional shaped object according to claim 1, wherein an inclination angle of a third end surface of the first rising portion with respect to the stage is smaller than the inclination angle of the side surface of the nozzle with respect to the stage.

6. The method for shaping the three-dimensional shaped object according to claim 1, wherein in the heating of the first end surface of the first section, a temperature of the first end surface of the first section is higher than a glass transition point of the shaping material.

* * * * *